(12) United States Patent
Yamada et al.

(10) Patent No.: US 7,589,486 B2
(45) Date of Patent: Sep. 15, 2009

(54) CONTROL SYSTEM FOR MULTIPHASE ROTARY ELECTRIC MACHINES

(75) Inventors: Takahiro Yamada, Nagoya (JP); Hiroya Tsuji, Yokkaichi (JP)

(73) Assignee: Denso Corporation, Kariya (JP)

( * ) Notice: Subject to any disclaimer, the term of this patent is extended or adjusted under 35 U.S.C. 154(b) by 356 days.

(21) Appl. No.: 11/785,051

(22) Filed: Apr. 13, 2007

(65) Prior Publication Data

US 2007/0241703 A1 Oct. 18, 2007

(30) Foreign Application Priority Data

Apr. 14, 2006 (JP) ............................. 2006-112128

(51) Int. Cl.
*H02P 7/00* (2006.01)
*H02P 7/06* (2006.01)
(52) U.S. Cl. .................. 318/432; 318/400.02; 318/461; 318/474
(58) Field of Classification Search ................. 318/432, 318/461, 474, 254, 400.02
See application file for complete search history.

(56) References Cited

U.S. PATENT DOCUMENTS

| | | | |
|---|---|---|---|
| 5,942,876 A | 8/1999 | Maekawa | |
| 6,222,335 B1 * | 4/2001 | Hiti et al. ..................... | 318/432 |
| 6,369,535 B1 * | 4/2002 | Wang et al. ............ | 318/400.23 |
| 6,919,700 B2 * | 7/2005 | Maslov et al. ............ | 318/400.2 |
| 6,933,692 B2 * | 8/2005 | Gabriel et al. ............... | 318/432 |
| 7,049,782 B2 * | 5/2006 | Chen et al. ................... | 318/609 |
| 7,053,581 B2 * | 5/2006 | Chen et al. ................... | 318/609 |
| 2003/0218439 A1 * | 11/2003 | Gabriel et al. ............... | 318/433 |
| 2005/0078431 A1 * | 4/2005 | Iwatsuki et al. .............. | 361/216 |
| 2005/0187696 A1 * | 8/2005 | Stroh .......................... | 701/84 |
| 2008/0290826 A1 * | 11/2008 | Nagase et al. ........... | 318/400.02 |
| 2008/0297077 A1 * | 12/2008 | Kovudhikulrungsri et al. ...................... | 318/400.02 |
| 2009/0015182 A1 * | 1/2009 | Kariatsumari et al. ... | 318/400.02 |
| 2009/0021194 A1 * | 1/2009 | Tonami et al. .......... | 318/400.02 |

FOREIGN PATENT DOCUMENTS

JP H10-174453 6/1998

* cited by examiner

*Primary Examiner*—Paul Ip
(74) *Attorney, Agent, or Firm*—Nixon & Vanderhye, PC

(57) ABSTRACT

A control system controls, based on a comparison between a waved real current to be supplied to a multiphase rotary electric machine and a hysteresis region established by a waved command signal, a switching timing of a switching element of an inverter to which a direct current voltage is applied to thereby match the waved real current with a waved request current. A determining unit determines whether a workload associated with rotation of the portion of the multiphase rotary electric machine is equal to or greater than a corresponding predetermined value. When it is determined that the workload is equal to or greater than the predetermined value, a changing unit changes the waved command signal from being set to the waved request current so as to determine the switching timing of the switching element based on a positional relation between the waved request current and the changed waved command signal.

26 Claims, 21 Drawing Sheets

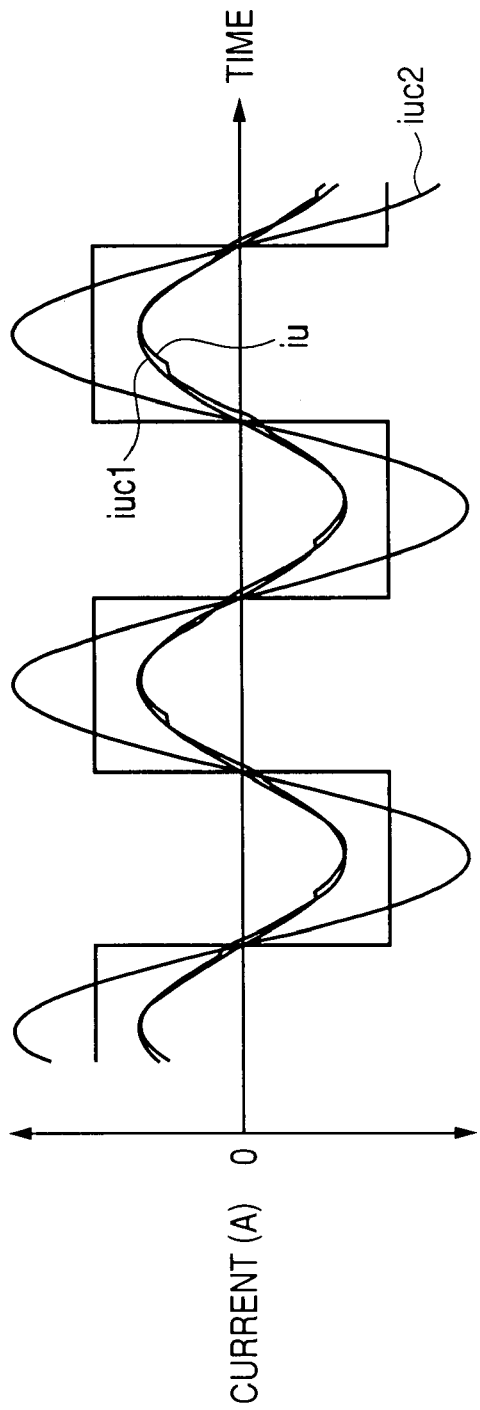
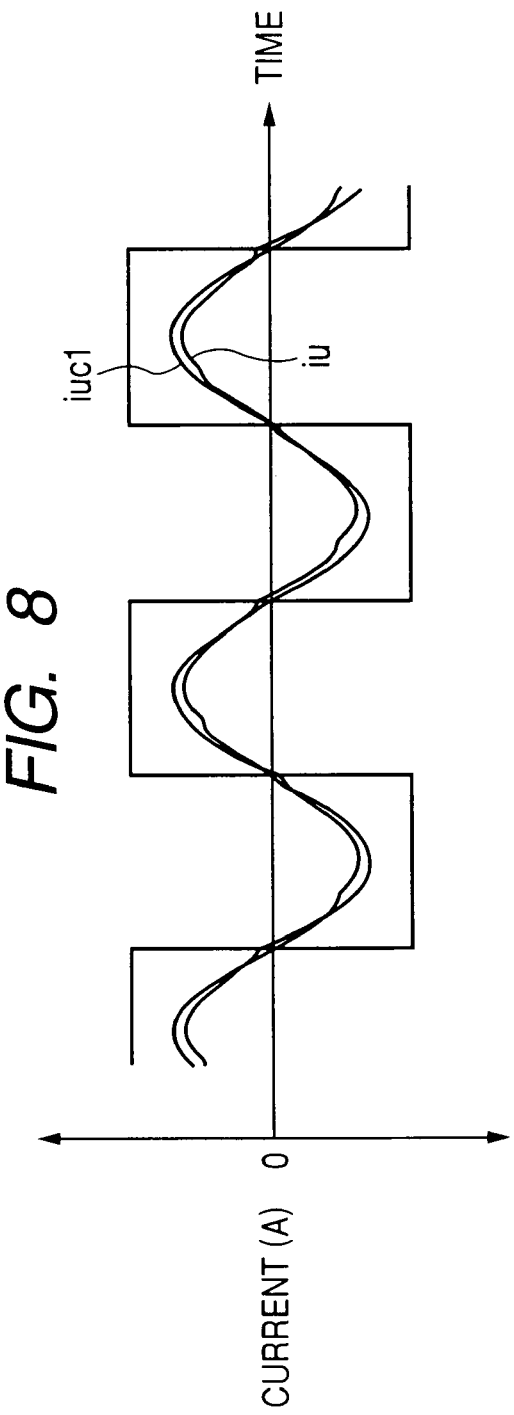

CONTROL SYSTEM FOR MULTIPHASE ROTARY ELECTRIC MACHINES

CROSS REFERENCE TO RELATED APPLICATIONS

This application is based on Japanese Patent Application 2006-112128 filed on Apr. 14, 2006. This application claims the benefit of priority from the Japanese Patent Application, so that the descriptions of which are all incorporated herein by reference.

FIELD OF THE INVENTION

The present invention relates to control systems for multiphase rotary electric machines, which are designed to carry out instantaneous current control of switching elements of an inverter.

BACKGROUND OF THE INVENTION

U.S. Pat. No. 5,942,876 corresponding to Japanese Unexamined Patent Publication No. H10-174453 discloses control systems for a three-phase rotary electric machine. A typical example of the control systems is designed to carry out a feedback control for a current to be supplied to each phase of the three-phase rotary electric machine.

In the feedback control, during normal operation of the three-phase rotary electric machine, the control system compares an instantaneous current wave flowing through each phase of the three-phase rotary electric machine in amplitude with an upper limit of a predetermined hysteresis width of a command current wave for each phase and with a lower limit thereof.

The control system of the typical example controls switching timings of each of switching elements of an inverter in bridge configuration based on the comparison result. This allows the instantaneous current wave flowing through each phase to be matched with a request current wave required for the three-phase rotary electric machine to output a request torque.

In contrast, during high RPM of the three-phase rotary electric machine, the control unit can carry out single pulse control.

Specifically, during high RPM of the three-phase rotary electric machine, the control system generates a single voltage pulse in every half cycle of the request current wave to be applied to each of the switching elements.

The feedback control of the control system set forth above may cause the instantaneous current wave of each phase to be deviated from the request current wave for each phase with increase in the RPM of the three-phase rotary electric machine. This may make it difficult for the three-phase rotary electric machine to generate the request torque. This problem will be described hereinafter with reference to FIG. 27.

FIG. 27 schematically illustrates a current wave flowing through one phase of a three-phase rotary electric machine and a duty cycle (switching pattern) of the corresponding one phase. In FIG. 27, a solid line L1 represents an instantaneous current wave flowing through the one phase, and a long and short dashed line L2 represents a command current wave for the one phase. In addition, a chain double-dashed line L3 represents an upper limit of a predetermined hysteresis width of the command current wave, and a chain double-dashed line L4 represents a lower limit of the predetermined hysteresis of the command current wave.

As illustrated in FIG. 27, during the normal operation of the three-phase rotary electric machine with comparative low RPM and magnitude of request torque, the instantaneous current wave L1 follows the command current wave L2 while inching within the range between the upper and lower limits of the predetermined hysteresis width of the command current wave.

During normal operation of the three-phase rotary electric machine, an input voltage of the inverter is sufficiently higher than a back electromotive force created in the three-phase machine. For this reason, the change in velocity of the instantaneous current wave L1 is sufficiently higher than that in velocity of the command current wave during normal operation of the three-phase rotary electric machine. This is a reason why the instantaneous current wave L1 follows the command current wave L2 even though the current wave L1 inches within the range of the predetermined hysteresis width.

In contrast, during high RPM of the three-phase rotary electric machine, the instantaneous current wave L1 is increasingly deviated in phase from the hysteresis width range of the command current wave L2. During high RPM of the three-phase rotary electric machine, an input voltage of the inverter has a narrow deviation compared with a back electromotive force created in the three-phase machine. For this reason, the change in velocity of the instantaneous current wave L1 is substantially equivalent to that in velocity of the command current wave during high RPM operation of the three-phase rotary electric machine. This is a reason why the instantaneous current wave L1 is increasingly deviated in phase from the hysteresis width range of the command current wave L2.

The phase deviation causes on and off timings of each switching element of the inverter to be delayed from those desired for the instantaneous current wave L1 (see FIG. 27), which may cause an output torque of the three-phase rotary electric machine to be deviated from the request torque.

In order to address the torque deviation problem, it is considered to narrow the range between the upper and lower limits of the hysteresis width of the command current wave so as to reduce the deviation between the output torque and the request torque. In addition, it is considered to carry out field-weakening control so as to reduce the electromotive force created in the three-phase machine.

In the former method, however, the reduction in the hysteresis width of the command current wave may cause an increase in the number of switchings of each switching element. The increase in the number of switchings of each switching element may reduce the voltage utilization factor of the three-phase rotary electric machine. Note that the voltage utilization factor is defined as a ratio of an input voltage of the inverter to a single-order component of an RMS value of a line-to-line voltage of a three-phase rotary electric machine.

The reduction in the voltage utilization factor may cause the amplitude of an instantaneous current flowing through each phase of the three-phase rotary electric machine to be reduced, which may increase the torque deviation.

In addition, when the rotor of a three-phase rotary electric machine consists of a permanent magnet, the latter method may degauss the permanent magnet of the rotor.

SUMMARY OF THE INVENTION

In view of the background, an object of at least one aspect of the present invention is to properly match an instantaneous current flowing through a phase of a multiphase rotary electric machine with a request current required for the multiphase rotary electric machine to create a request torque independently of operation modes of the multiphase rotary electric machine.

According to one aspect of the present invention, there is provided a control system. The control system is designed to control, based on a comparison between a waved real current to be supplied to a multiphase rotary electric machine and a hysteresis region established by a waved command signal, a switching timing of a switching element of an inverter to which a direct current voltage is applied to thereby match the waved real current with a waved request current. The waved real current allows a portion of the multiphase rotary electric machine to rotate. The waved command signal is set to the waved request current. The waved request current is required for the multiphase rotary electric machine to generate a request torque. The control system includes a determining unit configured to determine whether a workload associated with rotation of the portion of the multiphase rotary electric machine is equal to or greater than a corresponding predetermined value. The control system includes a changing unit configured to, when it is determined that the workload is equal to or greater than the predetermined value, change the waved command signal from being set to the waved request current so as to determine the switching timing of the switching element based on a positional relation between the waved request current and the changed waved command signal.

BRIEF DESCRIPTION OF THE DRAWINGS

Other objects and aspects of the invention will become apparent from the following description of embodiments with reference to the accompanying drawings in which:

FIG. 7 is a waveform chart schematically illustrating a result of simulations of a behavior of an instantaneous U-phase current as a representative example of three-phase instantaneous currents according to the first embodiment;

FIG. 8 is a waveform chart schematically illustrating a result of simulations of a behavior of an instantaneous U-phase current as a representative example of three-phase instantaneous currents;

DETAILED DESCRIPTION OF EMBODIMENTS OF THE INVENTION

Embodiments of the present invention will be described hereinafter with reference to the accompanying drawings. In each embodiment, the present invention is, for example, applied to a control system for a three-phase motor installed in a hybrid vehicle; this three-phase motor is an example of various types of multiphase rotary electric machines.

First Embodiment

Figure 1:
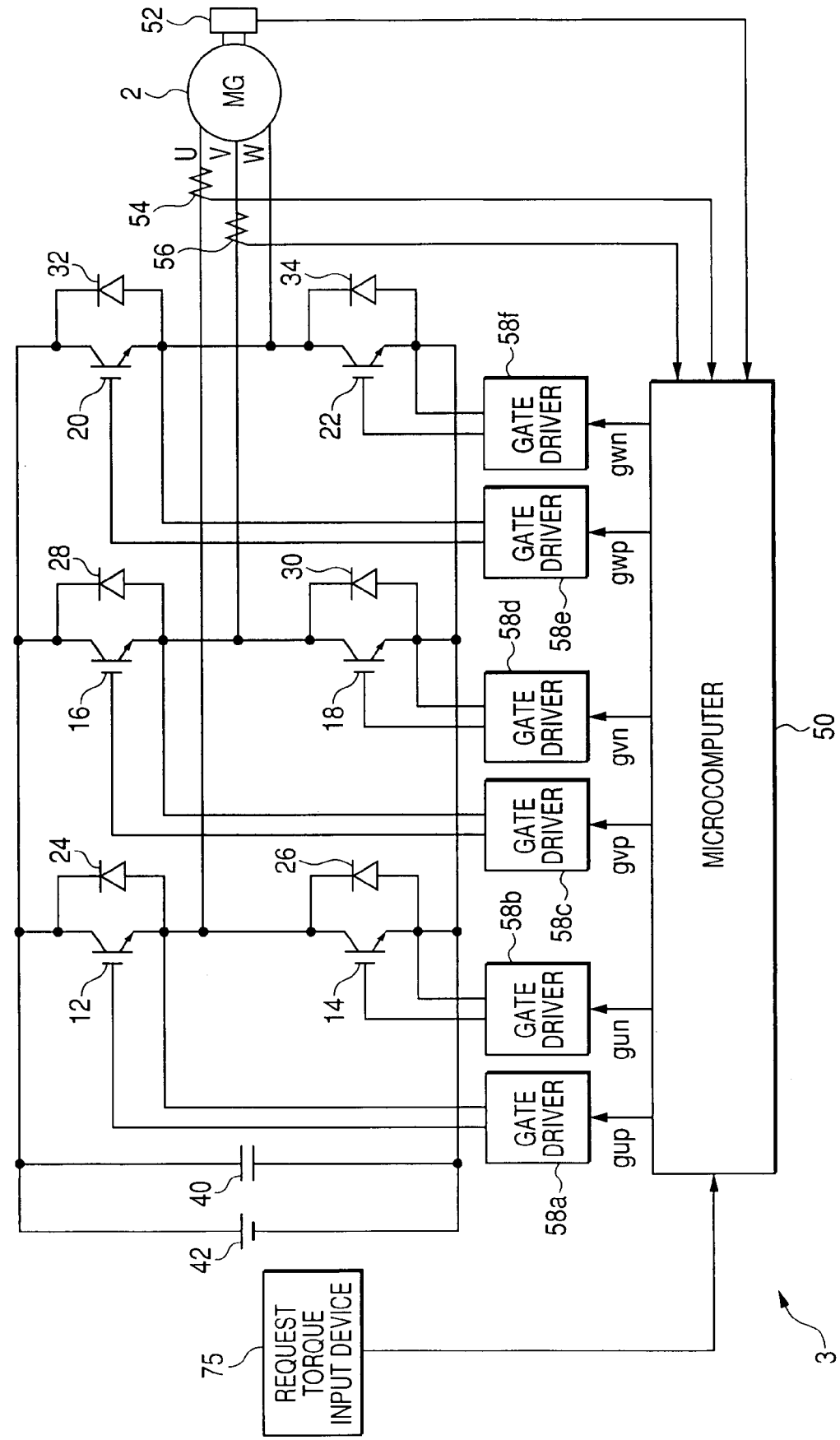
FIG. 1 is a circuit diagram of a control system according to a first embodiment of the present invention.

Referring to the drawings, in which like reference characters refer to like parts in several figures, particularly to FIG. 1, there is illustrated a three-phase DC (Direct Current) brushless motor, referred to simply as "motor" 2 and a control system 3 for controlling the motor 2.

For example, the motor 2 is provided with an annular rotor whose rotor core is fixedly fitted around the outer periphery of a crankshaft of an engine installed in the hybrid vehicle.

The rotor core of the rotor is provided at its circumferential portion with a number of N and S pole pairs arranged at given intervals. The rotor has a direct axis (d-axis) in line with a rotor N pole center line, and has a quadrature axis (q-axis) whose phase is π/2 radian electric angle leading with respect to a corresponding d-axis during rotation of the rotor.

The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

The stator core also has a plurality of slots. The slots are formed through the stator core and are circumferentially arranged at given intervals. The stator also includes a set of three-phase windings wound in the slots of the stator.

The three-phase windings are wound in the slots such that the U-phase winding, V-phase winding, and W-phase winding are shifted by an electric angle of, for example, 2π/3 radian in phase from each other.

One ends of the U-, V-, and W-phase windings are connected to each other in, for example, star configuration to constitute an individual neutral point.

On the other hand, the control system 3 includes an inverter 10.

The inverter 10 is designed as a three-phase inverter. The inverter 10 is composed of a first pair of series-connected switching elements 12 and 14, a second pair of series-connected switching elements 16 and 18, and a third pair of series-connected switching elements 20 and 22. The inverter 10 is also composed of flywheel diodes 24, 26, 28, 30, 32, and 34 parallely connected to the switching elements 12, 14, 16, 18, 20, and 22, respectively.

In the first embodiment, for example, as the switching elements 12, 14, 16, 18, and 20, IGBTs (Insulated Gate Bipolar Transistors) are respectively used. The cathode of each of the flywheel diodes 24, 26, 28, 30, 32, and 34 is connected to the drain of one of the switching elements (IGBTs), and the anode thereof is connected to the source of a corresponding one of the switching elements.

The first to third pairs of switching elements are parallely connected to each other in half-bridge configuration.

A connecting point through which the switching elements 12 and 14 of the first pair are connected to each other in series is connected to an output lead extending from the other end of the U-phase winding. Similarly, a connecting point through which the switching elements 16 and 18 of the second pair are connected to each other in series is connected to an output lead extending from the other end of the V-phase winding. Moreover, a connecting point through which the switching elements 20 and 22 of the third pair are connected to each other in series is connected to an output lead extending from the other end of the W-phase winding.

The control system 3 includes a smoothing capacitor 40 and a battery 42.

One end of the series-connected switching elements 12 and 14 of the first pair, such as the drain of the switching element 12, is connected to a positive terminal of the battery 42, and the other end thereof, such as the source of the second switching element 14, is connected to a negative terminal of the battery 42.

Similarly, one end of the series-connected switching elements 16 and 18 of the second pair is connected to the positive terminal of the battery 42, and the other end thereof is connected to the negative terminal of the battery 42. Moreover, one end of the series-connected switching elements 20 and 22 of the third pair is connected to the positive terminal of the battery 42, and the other end thereof is connected to the negative terminal of the battery 42.

In other words, the battery 42 is parallely connected to the first, second, and third pairs of switching elements, and the smoothing capacitor 40 is parallely connected to the battery 42.

This connecting configuration between the inverter 10 and the battery 42 allows an output voltage VH of the battery 42 to be applied, via the smoothing capacitor 40, across both ends of the first paired series-connected switching elements 12 and 14, both ends of the second paired series-connected switching elements 16 and 18, and both ends of the third paired series-connected switching elements 20 and 22.

The control system 3 includes a rotational position sensor 52, and first and second current sensors 54 and 56. In addition, the control system 3 includes a first pair of gate drivers 58a and 58b, a second pair of gate drivers 58c and 58d, a third pair of gate drivers 58e and 58f, and a microcomputer 50. The microcomputer 50 is designed as a normal computer circuit consisting essentially of, for example, a CPU, an I/O interface, and a memory unit.

The rotational position sensor 52 is arranged close to the rotor of the motor 2 and is operative to measure an actual rotational position (rotational angle) θ of the d-axis of the rotor with respect to a stator coordinate system fixed in space which characterizes the three-phase windings of the stator. The rotational position sensor 52 is connected to the microcomputer 50 and operative to send, to the microcomputer 50, the measured actual rotation angle of the rotor as one of motor state variables.

The first current sensor 54 is arranged to allow measurement of an instantaneous U-phase alternating current flowing through the U-phase winding of the stator. Similarly, the second current sensor 56 is arranged to allow measurement of an instantaneous V-phase alternating current flowing through the V-phase winding of the stator. The first and second current sensors 54 and 56 are connected to the microcomputer 50.

Specifically, the first and second current sensors 54 and 56 are operative to send, to the microcomputer 50, the instantaneous value of each of the U- and V-phase alternating currents as some of the motor state variables.

The microcomputer 50 is connected to a request torque input device 75 installed in the hybrid vehicle. The request torque input device 75 is operative to input, to the microcomputer 50, a commanded torque (request torque) of a user, such as an acceleration command of the user.

For example, an accelerator position sensor installed in the hybrid vehicle can be used as the request torque input device 75. Specifically, the accelerator position sensor is operative to sense an actual position of an accelerator pedal of the hybrid vehicle operable by the driver and to send, as data representing a request torque of the driver, the sensed actual position of the accelerator pedal to the microcomputer 50. The data representing a variable request torque will be referred to as "request torque data or request torque" hereinafter.

The switching elements 12, 14, 16, 18, 20, and 22 have control terminals, such as the gates, connected to the gate drivers 58a, 58b, 58c, 58d, 58e, and 58f, respectively. The gate drivers 58a, 58b, 58c, 58d, 58e, and 58f are connected to the microcomputer 50, which allows the microcomputer 50 to individually control the gate drivers 58a, 58b, 58c, 58d, 58e, and 58f, thereby individually switching on and off the corresponding switching elements 12, 14, 16, 18, 20, and 22, respectively.

When the request torque data, the motor state variables, the instantaneous values of the U- and V-phase alternating currents, and/or the engine operating condition date are input thereto, the microcomputer 50 is operative to receive them. Then, the microcomputer 50 is operative to calculate, using the Kirchhoff's law, an instantaneous W-phase alternating current flowing through the W-phase winding based on the measured instantaneous U- and V-phase alternating current values.

Next, the microcomputer 50 is operative to cause the gate drivers 58a to 58f to individually turn on and off the switching elements 12, 14, 16, 18, 20, and 22, respectively, based on the actual rotation angle of the rotor, the U-, V-, and W-phase alternating currents, and the request torque data.

Figure 2:
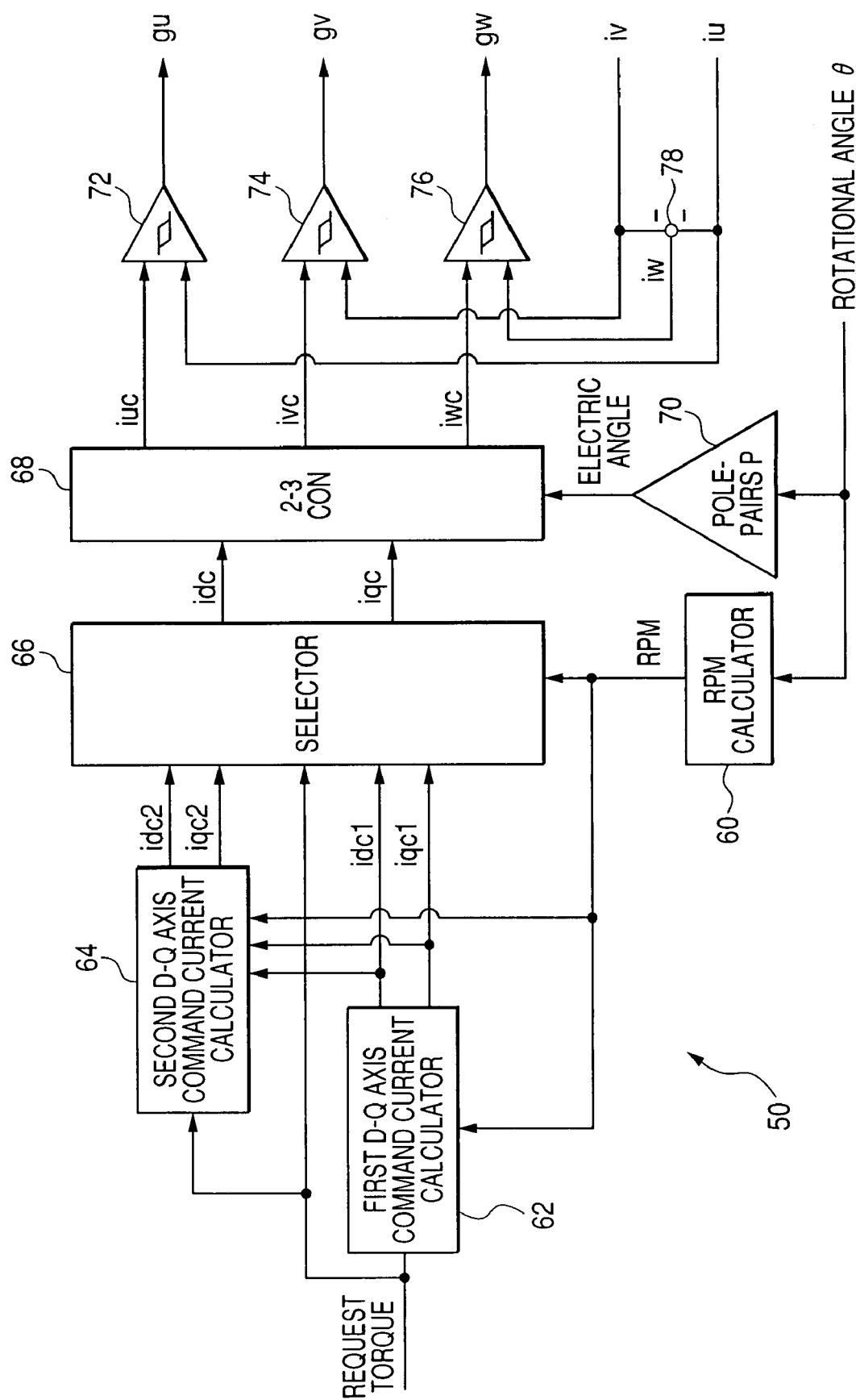
FIG. 2 is a block diagram schematically illustrating functional modules of a microcomputer equivalent to tasks to be executed thereby according to the first embodiment.

FIG. 2 schematically illustrates functional modules of the microcomputer 50 equivalent to tasks to be executed thereby.

As illustrated in FIG. 2, the microcomputer 50 includes an RPM calculator 60. The RPM calculator 60 works to calculate the RPM of the motor 2 based on the actual rotational angle θ of the rotor.

The microcomputer 50 includes a first d-q axis command current calculator 62. The first d-q axis command current calculator 62 works to calculate first command current d-axis component idc1 and q-axis component iqc1 in the d and q axes of the rotor based on the request torque data and the RPM calculated by the RPM calculator 60 and input therefrom. Note that the first command current d-axis component idc1 and q-axis component iqc1 in the d and q axes will be referred to simply as "first command values idc1 and iqc1".

The first command values idc1 and iqc1 correspond to request three-phase currents in the d and q axes; these request currents are required to generate the request torque.

The microcomputer 50 includes a second d-q axis command current calculator 64. The second d-q axis command current calculator 64 works to calculate second command current d-axis component idc2 and q-axis component iqc2 in the d and q axes of the rotor based on the request torque data, the RPM of the motor 2 input from the RPM calculator 60, and the first command values idc1 and iqc1. Note that the second command current d-axis component idc2 and q-axis component iqc2 in the d and q axes will be referred to simply as "second command values idc2 and iqc2".

The microcomputer 50 includes a current value selector (SELECTOR) 66. The current value selector 66 works to select, as finally determined command values (d-axis and q-axis components) idc and iqc in the d and q axes of the rotor, either the first command values idc1 and iqc1 or the second command values idc2 and iqc2 based on the input RPM of the motor 2.

The microcomputer 50 includes a two-phase to three-phase converter 68 (abbreviated as "2-3 CON 68" in FIG. 2). The two-phase to three-phase converter 68 works to convert the finally determined command values idc and iqc in the d and q axes of the rotor into U-, V-, and W-phase command values iuc, ivc, and iwc for the U-, V-, and W-phase windings, respectively, based on an electric angle. The electric angle can be obtained by multiplying the rotational angle θ by the number p of pole pairs of the rotor (see the reference number "70" as "POLE-PAIRS P").

The microcomputer 50 includes hysteresis comparators 72, 74, and 76 to which the U-phase command value iuc, V-phase command value ivc, and W-phase command value iwc are passed, respectively. In addition, an instantaneous U- and V-phase alternating current values iu and iv measured by the current sensors 54 and 56 are input to the hysteresis comparators 72 and 74, respectively. The microcomputer 50 also includes a subtractor 78 to which the instantaneous U- and V-phase alternating current values iu and iv are input. The subtractor 78 works to multiply the sum of the instantaneous U- and V-phase alternating current values iu and iv by −1 so as to calculate an instantaneous alternating current value iw, thereby inputting the instantaneous alternating current value iw to the hysteresis comparator 76.

The hysteresis comparator 72 works to compare the instantaneous current value iu in amplitude with the range between an upper limit of a predetermined hysteresis width of the U-phase command value iuc and a lower limit thereof to output a drive pulse gu whose level is for example equivalent to:

a positive voltage level (logical high level) from when the instantaneous current value iu is lower than the lower limit of the predetermined hysteresis width of the U-phase command value iuc until when it is higher than the upper limit of the predetermined hysteresis width of the U-phase command value iuc; and a negative voltage level (logical low level) from when the instantaneous current value iu is higher than the upper limit of the predetermined hysteresis width of the U-phase command value iuc until when it is lower than the lower limit of the predetermined hysteresis width of the U-phase command value iuc.

The drive pulses gu with the positive and negative levels are subjected to waveform shaping so that drive pulses gup and gun for switching on and off of the corresponding switching elements 12 and 14 are generated, respectively.

Similarly, the hysteresis comparator 74 works to compare the instantaneous current value iv in amplitude with the range between an upper limit of a predetermined hysteresis width of the V-phase command value ivc and a lower limit thereof to output a drive pulse gv whose level is for example equivalent to:

a positive voltage level (logical high level) from when the instantaneous current value iv is lower than the lower limit of the predetermined hysteresis width of the V-phase command value ivc until when it is higher than the upper limit of the predetermined hysteresis width of the V-phase command value ivc; and a negative voltage level (logical low level) from when the instantaneous current value iv is higher than the upper limit of the predetermined hysteresis width of the V-phase command value ivc until when it is lower than the lower limit of the predetermined hysteresis width of the V-phase command value ivc.

The drive pulses gv with the positive and negative levels are subjected to waveform shaping so that drive pulses gvp and gvn for switching on and off of the corresponding switching elements 16 and 18 are generated, respectively.

In addition, the hysteresis comparator 76 works to compare the instantaneous current value iw in amplitude with the range between an upper limit of a predetermined hysteresis width of the W-phase command value iwc and a lower limit thereof to output a drive pulse gw whose level is for example equivalent to:

a positive voltage level (logical high level) from when the instantaneous current value iw is lower than the lower limit of the predetermined hysteresis width of the W-phase command value iwc until when it is higher than the upper limit of the predetermined hysteresis width of the W-phase command value iwc; and a negative voltage level (logical low level) from when the instantaneous current value iw is higher than the upper limit of the predetermined hysteresis width of the W-phase command value iwc until when it is lower than the lower limit of the predetermined hysteresis width of the W-phase command value iwc.

The drive pulses gw with the positive and negative levels are subjected to waveform shaping so that drive pulses gwp and gwn for switching on and off of the corresponding switching elements 20 and 22 are generated, respectively.

Figure 3:
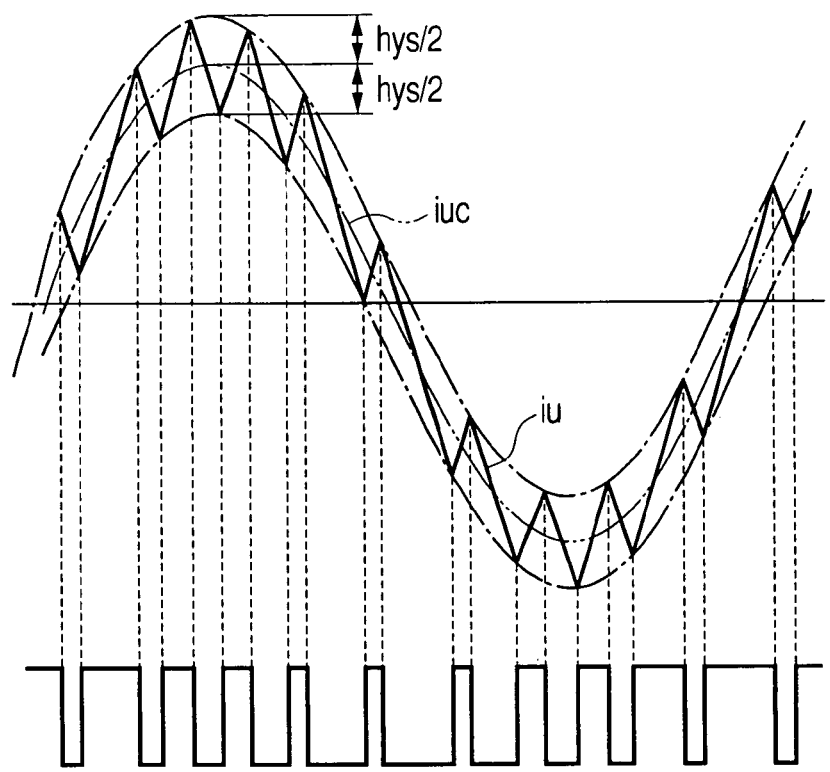
FIG. 3 is a waveform chart schematically illustrating waveforms of a U-phase instantaneous current and a U-phase command current according to the first embodiment.

As illustrated by the waveforms of the U-phase instantaneous current iu and the U-phase command current iuc in FIG. 3, the U-phase instantaneous current iu is controlled to be lied within the hysteresis region between first and second magnitudes. The first magnitude is higher in level by the half of the hysteresis width ("hys" in FIG. 3) than the amplitude of the U-phase command current iuc. The second magnitude is lower in level by the half of the hysteresis width than the amplitude of the U-phase command current iuc.

Specifically, the profile of the U-phase command current wave iuc provides the center of the hysteresis region in time.

The V- and W-phase instantaneous currents iv and iw can be controlled as well as the U-phase instantaneous current iu.

Note that, in the first embodiment, the instantaneous current control in which the instantaneous currents iu, iv, and iw are lied within the range between the corresponding hysteresis regions obtained by the command currents iuc, ivc, and iwc is carried out by the microcomputer 50. Therefore, while the motor 2 operates in a high RPM and torque mode described hereinafter, the single pulse control is carried out by the microcomputer 50.

Specifically, while the motor 2 operates in the high RPM and torque mode, the single pulse control is carried out so that each of the drive pulses gu, gv, and gw is matched in the time of positive or negative voltage with a half cycle of a corresponding one of the command currents iuc, ivc, and iwc. The single pulse control can theoretically maximize the voltage utilization factor of the motor 2. Note that the voltage utilization factor is defined as a ratio of an input voltage of the inverter 10, which corresponds to the output voltage of the battery 42, to a single-order component of an RMS value of a line-to-line voltage of the motor 2.

However, as described above, while the motor 2 operates in the high RPM and torque mode, the input voltage of the inverter 10 is approximately equivalent to a back electromotive force created in the motor 2. For this reason, the instantaneous currents iu, iv, and iw are respectively deviated in phase from the command currents iuc, ivc, and iwc. This may cause, as set forth above, an output torque of the motor 2 to be deviated from the request torque.

Thus, in the first embodiment, while the motor 2 operates in the high RPM and torque mode, the instantaneous current control is carried out by the microcomputer 50 based on second U-, V-, and W-phase command values iuc2, ivc2, and iwc2 for the U-, V-, and W-phase windings. These second U-, V-, and W-phase command values iuc2, ivc2, and iwc2 have been obtained by the two-phase and three-phase converter 68 based on the second command values idc2 and iqc2 selected by the current value selector 66.

In contrast, while the motor 2 operates in a low RPM/torque mode except for the high RPM and torque mode, the instantaneous current control is carried out by the microcomputer 50 based on first U-, V-, and W-phase command values iuc1, ivc1, and iwc1 for the U-, V-, and W-phase windings. These first U-, V-, and W-phase command values iuc1, ivc1, and iwc1 have been obtained by the two-phase and three-phase converter 68 based on the first command current values idc1 and iqc1 selected by the current value selector 66.

Figure 4:
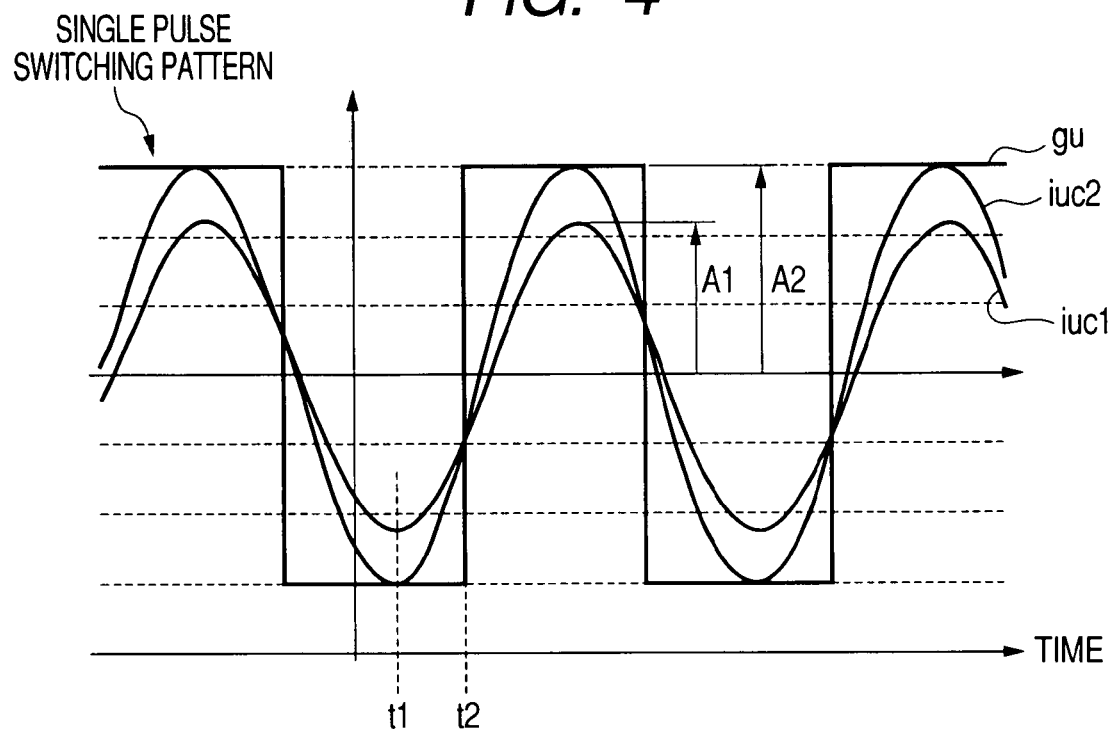
FIG. 4 is a waveform chart schematically illustrating waveforms of a U-phase first command current, a U-phase second command current, and a drive pulse according to the first embodiment.

For example, the waveform of the second U-phase command value iuc2 is illustrated in FIG. 4.

Specifically, the second U-, V-, and W-phase command values iuc2, ivc2, and iwc2 are greater in amplitude than the first U-, V-, and W-phase command values iuc1, ivc1, and iwc1, and deviated in phase therefrom.

The second U-, V-, and W-phase command values iuc2, ivc2, and iwc2 are calculated based on the first U-, V-, and W-phase command values iuc1, ivc1, and iwc1 and drive pulses gu, gv, and gw.

Specifically, as illustrated in FIG. 4, the second U-, V-, and W-phase command values iuc2, ivc2, and iwc2 are generated such that timings when the second U-, V-, and W-phase command values iuc2, ivc2, and iwc2 intersecting with the first U-, V-, and W-phase command values iuc1, ivc1, and iwc1 coincide with reversal timings of the drive pulses gu, gv, and gw, respectively. This allows the drive pulses gu, gv, and gw generated by the instantaneous current control to generate the request torque in the single pulse control for the following reason.

As illustrated in FIG. 4, an amplitude A1 of the first U-phase command value iuc1 is higher than an amplitude A2 of the second U-phase command value iuc2 at a time t1. For this reason, when the instantaneous current iu follows the first U-phase command value iuc1, the drive pulse gu output from the hysteresis comparator 72 using the second U-phase command value iuc2 has the logical low level. Thereafter, when the second U-phase command value iuc2 intersects with the first U-phase command value iuc1 at a time t2, the first U-phase command value iuc1 is lower in amplitude than the second U-phase command value iuc2.

When the second U-phase command value iuc2 is greater in amplitude than the first U-phase command value iuc1, the drive pulse gu output from the hysteresis comparator 72 is reversed in level at the time t2 or close thereto. For this reason, the drive pulse gu output from the hysteresis comparator 72 can be set to a drive pulse required to generate the request torque in the single pulse control.

Note that, in FIG. 4, the drive pulse gu has a peak-to-peak magnitude equivalent to peak-to-peak amplitude of the second U-phase command value iuc2. This relationship can be obtained by regulating a reference voltage for the drive pulse gu and a reference current for the second U-phase command value iuc2.

Next, operations of the microcomputer 50 in the instantaneous current control using the second U-, V-, and W-phase command values iuc2, ivc2, and iwc2 will be described hereinafter.

Figure 5:
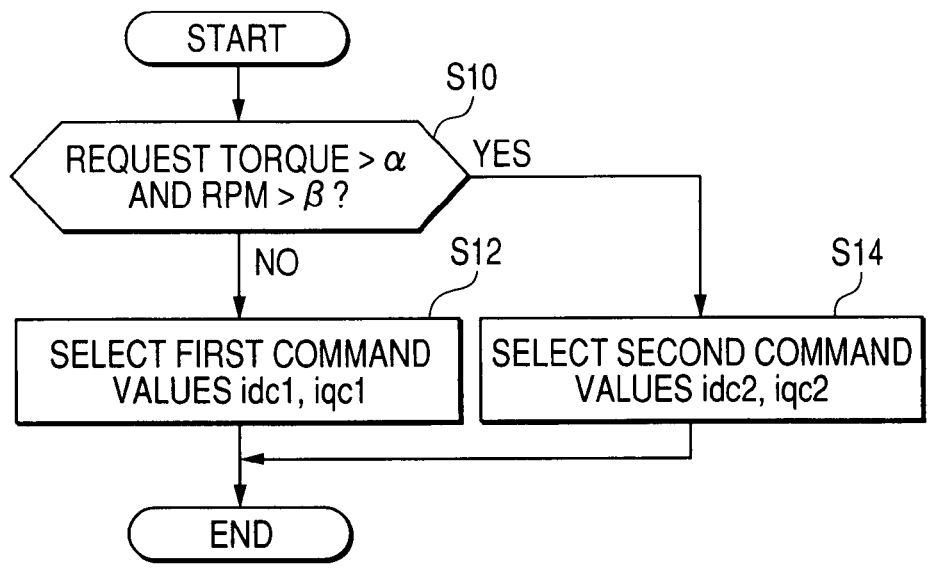
FIG. 5 is a flowchart schematically illustrating operations executed by a current value selector illustrated in FIG. 1.

FIG. 5 schematically illustrates operations executed by the current value selector 66, which are repeated at a predetermined cycle.

In step S10, the current value selector 66 determines whether the request torque is greater in magnitude than a predetermined torque α and the RPM of the motor 2 is higher than a predetermined threshold RPM β. The request torque can be replaced with the output torque of the motor 2. The RPM and/or the request torque (output torque) of the motor 2 represent the workload of the motor 2. Specifically, in the first embodiment, the current value selector 66 determines whether the workload of the motor 2 is equal to or greater than a predetermined value.

The determination allows the current value selector 66 to determine whether the back electromotive force generated by the motor 2 is approximated to the input voltage of the inverter 10.

When it is determined that either the request torque is not greater in magnitude than the predetermined torque α or the RPM of the motor 2 is not higher than the predetermined RPM β, the current value selector 66 selects the first U-, V-, and W-phase command values iuc1, ivc1, and iwc1 in step S12.

Otherwise when it is determined that both the request torque is greater in magnitude than the predetermined torque α and the RPM of the motor 2 is higher than the predetermined RPM β, the current vector value selector 66 determines that the motor 2 operates in the high RPM and torque mode. Then, the current value selector 66 selects the second U-, V-, and W-phase command values iuc2, ivc2, and iwc2 in step S14.

Figure 6:
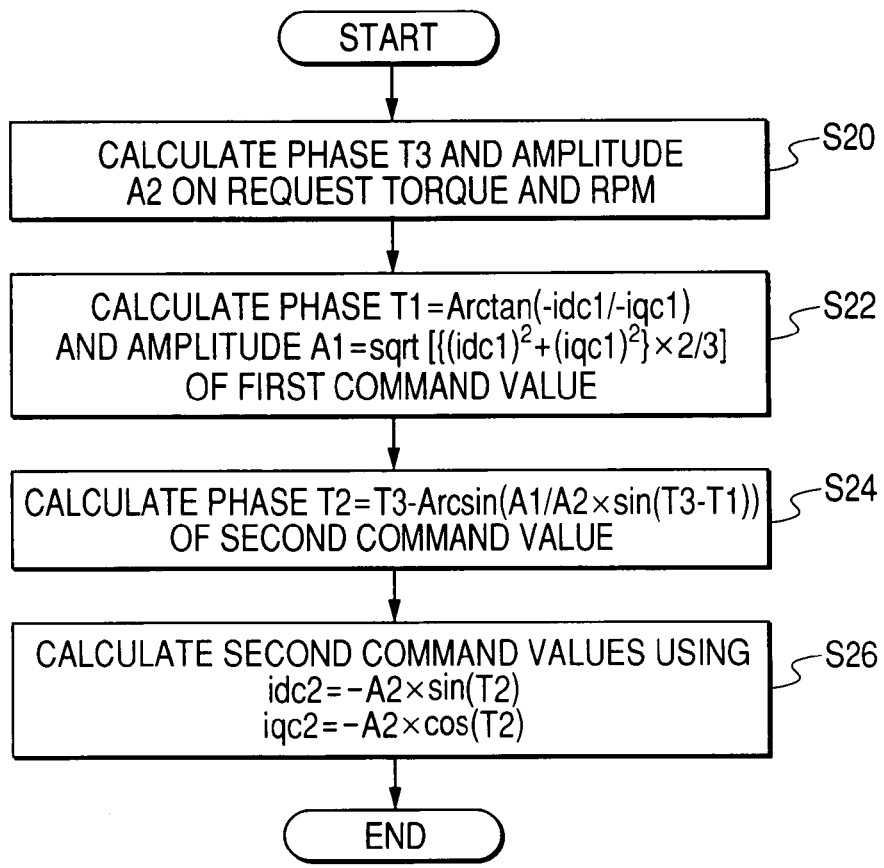
FIG. 6 is a flowchart schematically illustrating operations executed by a second d-q axis command current calculator illustrated in FIG. 1.

FIG. 6 schematically illustrates operations executed by the second d-q axis command current calculator 64, which are repeated at a predetermined cycle when the affirmative determination is performed in step S10 of FIG. 5.

In step S20, the second d-q axis command current calculator 64 calculates an on timing of each of the switching elements 12, 14, 16, 18, 20, and 22 and an amplitude A2 of each of the second U-, V-, and W-phase command values iuc2, ivc2, and iwc2 based on the input request torque and the RPM of the motor 2. The on timing of each of the switching elements 12, 14, 16, 18, 20, and 22 corresponds to a switching phase T3. For example, a relationship between a variable of the switching phase T3 and a variable of each of the input request torque and the RPM has been determined to be stored in the second d-q axis command current calculator 64 as a map M by simulations and/or tests. The map M is composed of, for example, a data table and/or a program. Other maps described hereinafter can be composed of, for example, a data table and/or a program.

It is preferable that the amplitude A2 of each of the second U-, V-, and W-phase command values iuc2, ivc2, and iwc2 is equal to or lower than a level Amax. The level Amax can be calculated by multiplying a maximum rating current of the inverter 10 by the square root of "2". Specifically, when a current flows through one phase of the motor 2 is equal to the value Amax, a current flowing through corresponding switching elements of the inverter 10 is substantially matched with the maximum rating current.

For this reason, set of the amplitude A2 to be lower than the value Amax allows, when the current flowing through one phase of the motor 2 exceeds the maximum rating current, the instantaneous current control to reduce the current. Thus, it is possible to prevent a current flowing through one phase of the motor 2 from exceeding the maximum rating current. The amplitude A2 of each of the second U-, V-, and W-phase command values iuc2, ivc2, and iwc2 can be established as a fixed value. Preferably, the higher the amplitude A1 of each of the first U-, V-, and W-phase command values iuc1, ivc1, and iwc1 is, the higher the amplitude A2 of a corresponding one of the second U-, V-, and W-phase command values iuc2, ivc2, and iwc2. This allows the instantaneous currents iu, iv, and iw to be close to the corresponding first U-, V-, and W-phase command values iuc1, ivc1, and iwc1, which are required to generate the request torque.

In step S22, the second d-q axis command current calculator 64 calculates a phase T1 and an amplitude A1 of each of the first U-, V-, and W-phase command values iuc1, ivc1, and iwc1 in accordance with the following procedures.

Note that each of the first U-, V-, and W-phase command values iuc1, ivc1, and iwc1 is given by the following equation [1]:

$$iuc1, ivc1, \text{ or } iwc1 = A1 \times \sin(\omega t - T1) \quad [1]$$

where ω represents an electric angular velocity represented by the following equation [2]:

$$\omega = 2\pi p Nm/60 \quad [2]$$

where p represents the number of pole pairs of the rotor of the motor 2, and Nm [rpm] represents the RPM of the motor 2.

Therefore, the phase T1 is defined by "arctan(−idc1/−iqc1)". The amplitude A1 is defined by the square root of the product of ⅔ and the sum of squares of the first d-axis command current value idc1 and squares of the first q-axis command current value iqc1.

In step S24, the second d-q axis command current calculator 64 calculates a phase T2 of each of the second U-, V-, and W-phase command values iuc2, ivc2, and iwc2 in accordance with the following procedures.

Note that each of the second U-, V-, and W-phase command values iuc2, ivc2, and iwc2 is given by the following equation [3]:

$$iuc2, ivc2, \text{ or } iuc2 = A2 \times \sin(\omega t - T2) \quad [3]$$

Thus, a phase when the equation [1] and the equation [2] are identical to each other is defined as a switching phase T3, so the following equation [4] can be established:

$$A1 \times \sin(\omega \times T3 - T1) = A2 \times \sin(\omega \times T3 - T2) \quad [4]$$

Thus, the phase T2 can be calculated by the following equation [5]

$$T2 = T3 - \arcsin\{(A1/A2) \times \sin(\omega \times T3 - T1)\} \quad [5]$$

In step S26, the second d-q axis command current calculator 64 calculates the second command current value idc2 and the second command current value iqc2 in accordance with the following equations [6] and [7]:

$$idc2 = -A2 \times \sin(T2) \quad [6]$$

$$iqc2 = -A2 \times \cos(T2) \quad [7]$$

FIG. 7 schematically illustrates a result of simulations of a behavior of the instantaneous U-phase current iu as a representative example of the three-phase instantaneous currents iu, iv, and iw. The simulations were carried out in accordance with the instantaneous current control (single pulse control) using the second U-, V-, and W-phase command values iuc2, ivc2, and iwc2 while the motor 2 operates in the high RPM and torque mode.

As illustrated in FIG. 7, the real U-phase current iu properly follows the first U-phase command value iuc1 required to generate the request torque.

In contrast, FIG. 8 schematically illustrates a result of simulations of a behavior of the instantaneous U-phase current iu as a representative example of the three-phase instantaneous currents iu, iv, and iw. The simulations were carried out in accordance with the instantaneous current control (single pulse control) using the first U-, V-, and W-phase command values iuc1, ivc1, and iwc1 while the motor 2 operates in the high RPM and torque mode.

As illustrated in FIG. 8, the real U-phase current iu follows the first U-phase command value iuc1 with a delay, the delay causes the output torque of the motor 2 to be deviated from the request torque.

As described above, the control system 3 for the motor 2 according to the first embodiment can mainly achieve the following first to fifth effects.

Specifically, when both the request torque is greater in magnitude than the predetermined torque $\alpha$ and the RPM of the motor 2 is higher than the predetermined RPM $\beta$, the instantaneous current control using the first three-phase command values equivalent to the request current values is shifted to the instantaneous current control using the second three-phase command values. The second three-phase command values have the same periods as the corresponding first three-phase command values, and the amplitudes higher than those of the corresponding first three-phase command values.

While the motor 2 operates in the high RPM and torque mode, the control system 3 allows, as the first effect, the real three-phase currents iu, iv, and iw to be matched with the request three-phase currents (first three-phase command values) required to generate the request torque in the single pulse control.

Conventionally, when an open loop control for applying a voltage to each of the three-phase windings every the rotor rotates by 180 degrees, it is difficult to address a case where the current flowing through one phase of the motor 2 exceeds the maximum rating current.

However, in the first embodiment, set of the amplitude A2 to be lower than the value Amax makes it possible to prevent a current flowing through one phase of the motor 2 from exceeding the maximum rating current in the single pulse control as the second effect.

The control system 3 is configured such that the second three-phase command values intersect with the request three-phase currents at the reversal timings of the drive pulses gu, gv, and gw each of which is matched in phase with a half cycle of a corresponding one of the request three-phase currents. This makes it possible to, as the third effect, reverse the drive pulses gu, gv, and gw at the intersection timings or thereabout.

The single two-phase and three-phase converter 68 can be shared between the first command values idc1 and iqc1 and the second command values idc2 and iqc2, making it possible to, as the fourth effect, simply configure converting means for converting command values in the d and q axes into three-phase command values.

As the fifth effect, generation of the second command values idc2 and iqc2 based on the first command values idc1 and iqc1 allows the structure of means for calculating the second command values idc2 and iqc2, such as the second d-q axis command current calculator 64, to be simplified.

Second Embodiment

A control system for a motor according to a second embodiment of the present invention will be described hereinafter. The structure of the control system is substantially identical to that of the control system 3 according to the first embodiment.

Thus, like reference characters are assigned to like parts in the control systems according to the first and second embodiments, and therefore, descriptions of the structure of control system according to the second embodiment are omitted.

Figure 9:
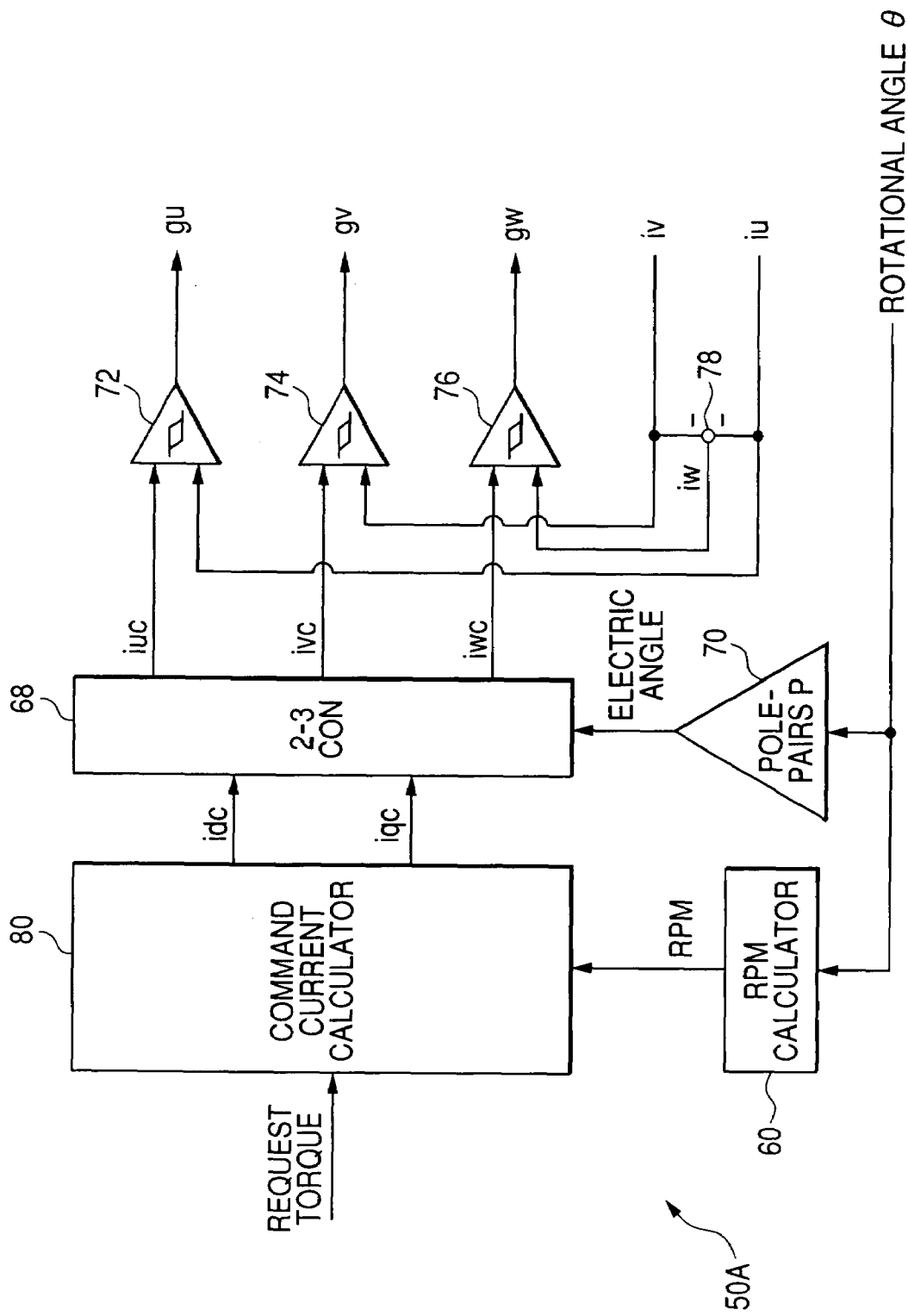
FIG. 9 is a block diagram schematically illustrating functional modules of a microcomputer equivalent to tasks to be executed thereby according to a second embodiment of the present invention.

FIG. 9 schematically illustrates functional modules of a microcomputer 50A equivalent to tasks to be executed thereby according to the second embodiment.

The microcomputer 50A includes a command current calculator 80 in place of the first d-q axis command current calculator 62, the second d-q axis command current calculator 64, and the current value selector 66.

The command current calculator 80 works to calculate the first command values idc1 and iqc1 and the second command values idc2 and iqc2 based on the input request torque and the RPM of the motor 2.

Figure 10A:
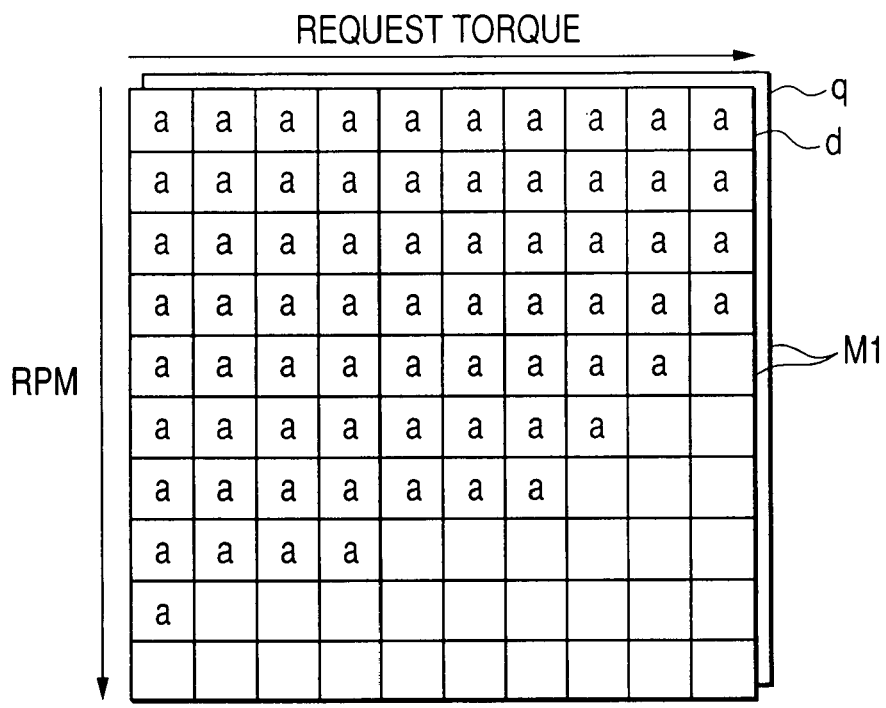
FIG. 10A is a view schematically illustrating first command calculating maps according to the second embodiment.
Figure 10B:
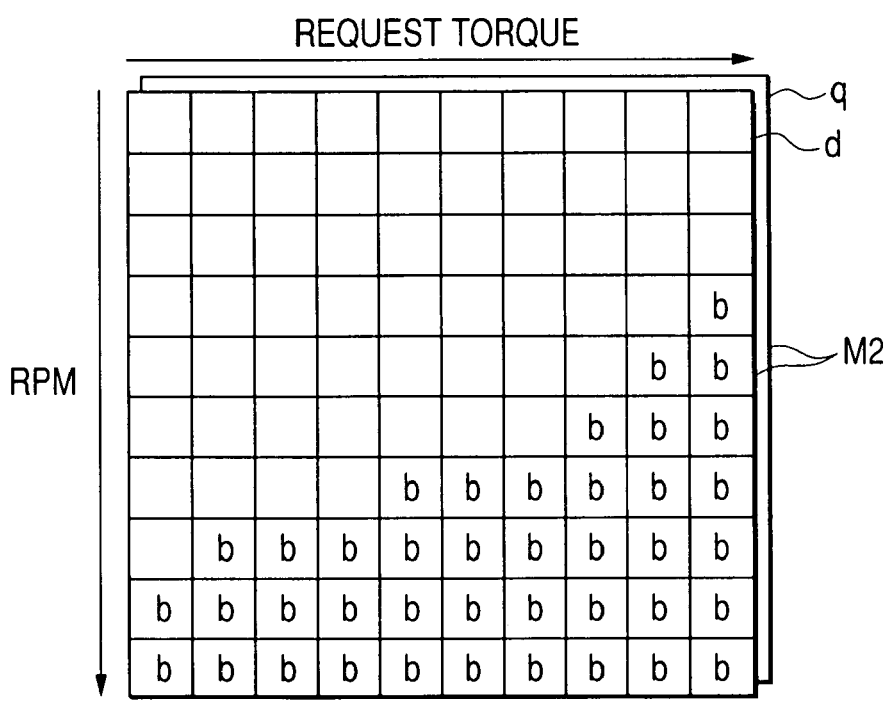
FIG. 10B is a view schematically illustrating second command calculating maps according to the second embodiment.

The command current calculator 80 has first command value calculating maps (first calculating maps) M1 illustrated in FIG. 10A and second command value calculating maps (second calculating maps) M2 illustrated in FIG. 10B. The command current calculator 80 is configured to calculate the first command values idc1 and iqc1 based on the first command value calculating maps M1, and calculate the second command values idc2 and iqc2 based on the second command value calculating maps M2.

One of the first command value calculating maps M1 represents a relationship between the first command value idc1, the input request torque, and the RPM of the motor 2. The other of the first command value calculating maps M1 represents a relationship between the first command value iqc1, the input request torque, and the RPM of the motor 2.

Similarly, one of the second command value calculating maps M2 represents a relationship between the second command value idc2, the input request torque, and the RPM of the motor 2. The other of the second command value calculating maps M2 represents a relationship between the second command value iqc2, the request torque, and the RPM.

In the first embodiment, the boundary at which the instantaneous current control using the first command values is switched to that using the second command values is set to be different from the boundary at which the instantaneous current control using the second command values is switched to that using the first command values. The instantaneous current control using the first command values will be referred to as "first instantaneous current control" hereinafter, and the instantaneous current control using the second command values will be referred to as "second instantaneous current control" hereinafter.

This prevents the first instantaneous current control and the second instantaneous current control from frequently switched from each other.

Figure 11A:
FIG. 11A is a view schematically illustrating a first map according to the second embodiment.
Figure 11B:
FIG. 11B is a view schematically illustrating a second map according to the second embodiment.

Specifically, the command current calculator 80 has, as command current selecting maps, a first map MS1 illustrated in FIG. 11A and a second map MS2 illustrated in FIG. 11B.

The first map MS1 is used to switch between the first command values and the second command values based on an input RPM of the motor 2 and an input request torque when the first instantaneous current control is selected.

The second map MS2 is used to switch between the first command values and the second command values based on an input RPM of the motor 2 and an input request torque when the second instantaneous current control is selected.

As illustrated in FIGS. 11A and 11B, each of the first and second maps MS1 and MS2 has a first region "1" in which the first command values are selected and a second region "2" in which the second command values are selected.

As clearly shown in FIGS. 11A and 11B, the first and second regions of the first map MS1 are different from those of the second map MS2.

Specifically, an input RPM of the motor 2 and an input request torque that correspond to the boundary at which the first and second command values are switched from each other in the second map MS2 are lower in magnitude than those that correspond to the boundary at which the first and second command values are switched from each other in the first map MS1.

This provides a hysteresis between the switching from the first instantaneous current control to the second instantaneous current control and the switching from the second instantaneous current control to the first instantaneous current control.

Figure 12:
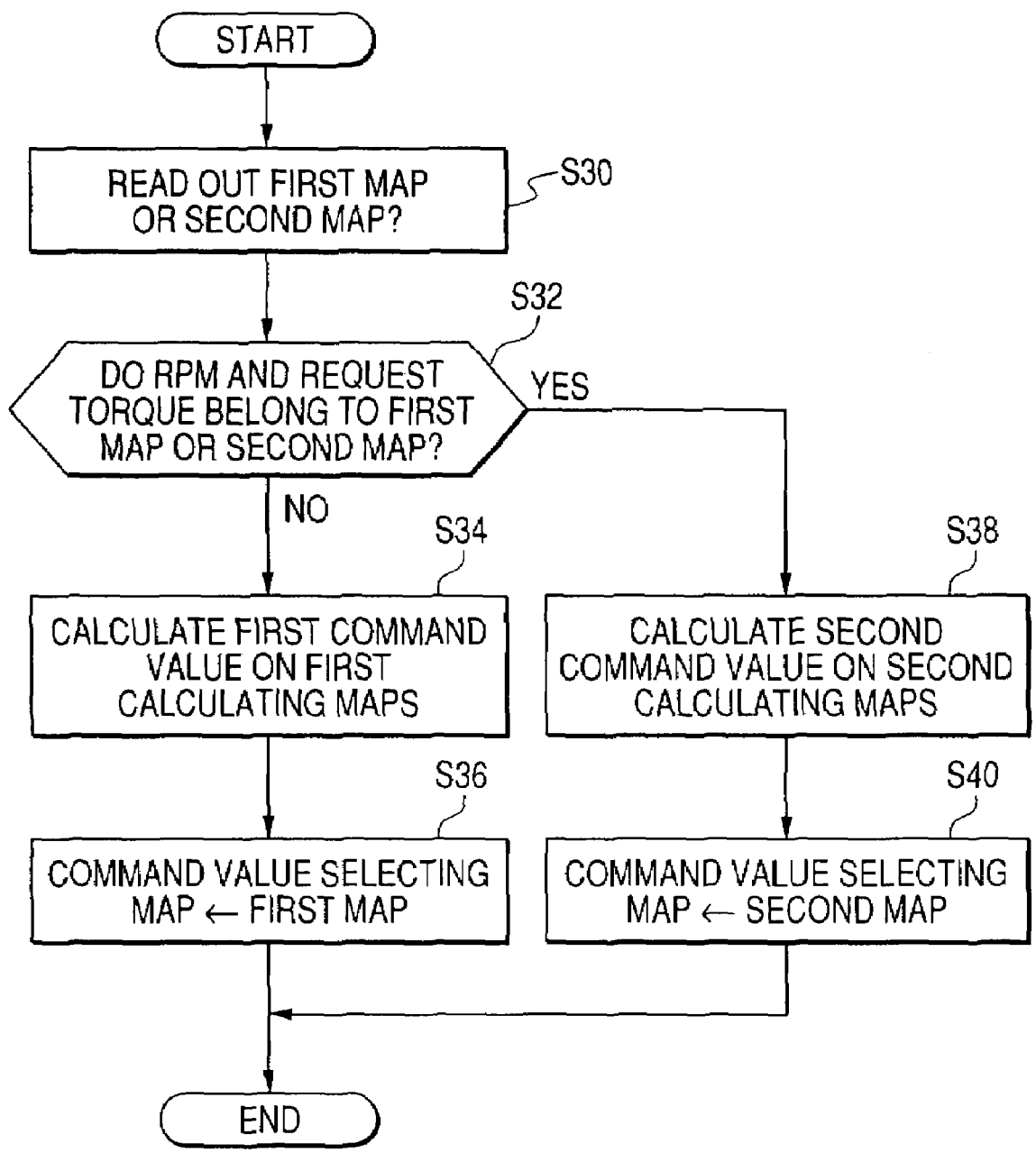
FIG. 12 is a flowchart schematically illustrating operations executed by a command current calculator illustrated in FIG. 1.

FIG. 12 schematically illustrates operations executed by the command current calculator 80 using each of the maps M1, M2, MS1, and MS2, which are repeated at a predetermined cycle.

In step S30, the command current calculator 80 reads out one of the first and second maps MS1 and MS2, which is currently selected, as the command value selecting map, in accordance with the selection of a corresponding one of the first and second instantaneous current controls.

In step S32, the command current calculator 80 determines whether current input request torque and RPM of the motor 2 belong to the region "2" in the readout map MS1 or MS2.

When it is determined that the current request torque and RPM do not belong to the region "2" in the readout map MS1 or MS2 (NO in step S32), the command current calculator 80 identifies that the current request torque and RPM belong to the region "1" in the readout map MS1 or MS2, proceeding to step S34.

In step S34, the command current calculator 80 calculates first command values corresponding to the current request torque and RPM based on the first command value maps M1. Next, in step S36, the command current calculator 80 stores therein the first map MS1 as the command value selecting map.

Otherwise when it is determined that the current request torque and RPM belong to the region "2" in the readout map MS1 or MS2 (YES in step S32), the command current calculator 80 identifies that the current request torque and RPM belong to the region "2" in the readout map MS1 or MS2, proceeding to step S38.

In step S38, the command current calculator 80 calculates second command values corresponding to the current request torque and RPM based on the second command value maps M2. Next, in step S40, the command current calculator 80 stores therein the second map MS2 as the command value selecting map.

As described above, the control system 3 for the motor 2 according to the second embodiment can mainly achieve the following sixth to eighth effects in addition to the first to fifth effects.

Specifically, the first command values can be calculated based on the first command calculating maps M1 in response to an input request torque and RPM of the motor 2. Similarly, the second command values can be calculated based on the second command calculating maps M2 in response to an input request torque and RPM of the motor 2. This makes it possible to properly determine the first command values and the second command values as the sixth effect.

As the seventh effect, calculation of the first and second command values in the d and q axes based on the maps M1 and M2 allows the number of maps to be reduced as compared with directly calculating three-phase command values using maps.

In a region determined depending on input request torque and RPM of the motor 2, the boundary at which the first instantaneous current control is switched to the second instantaneous current control is set to be different from that at which the second instantaneous current control is switched to the first instantaneous current control. This can prevent an input RPM and an input request torque from simultaneously hunting in the vicinity of the boundaries. Thus, as the eight effect, it is possible to prevent hunting in which the first instantaneous current control and the second instantaneous current control are frequently switched from each other.

Third Embodiment

A control system for a motor according to a third embodiment of the present invention will be described hereinafter. The structure of the control system is substantially identical to that of the control system 3 according to the first embodiment.

Thus, like reference characters are assigned to like parts in the control systems according to the first and third embodiments, and therefore, descriptions of the structure of control system according to the third embodiment are omitted.

Figure 13:
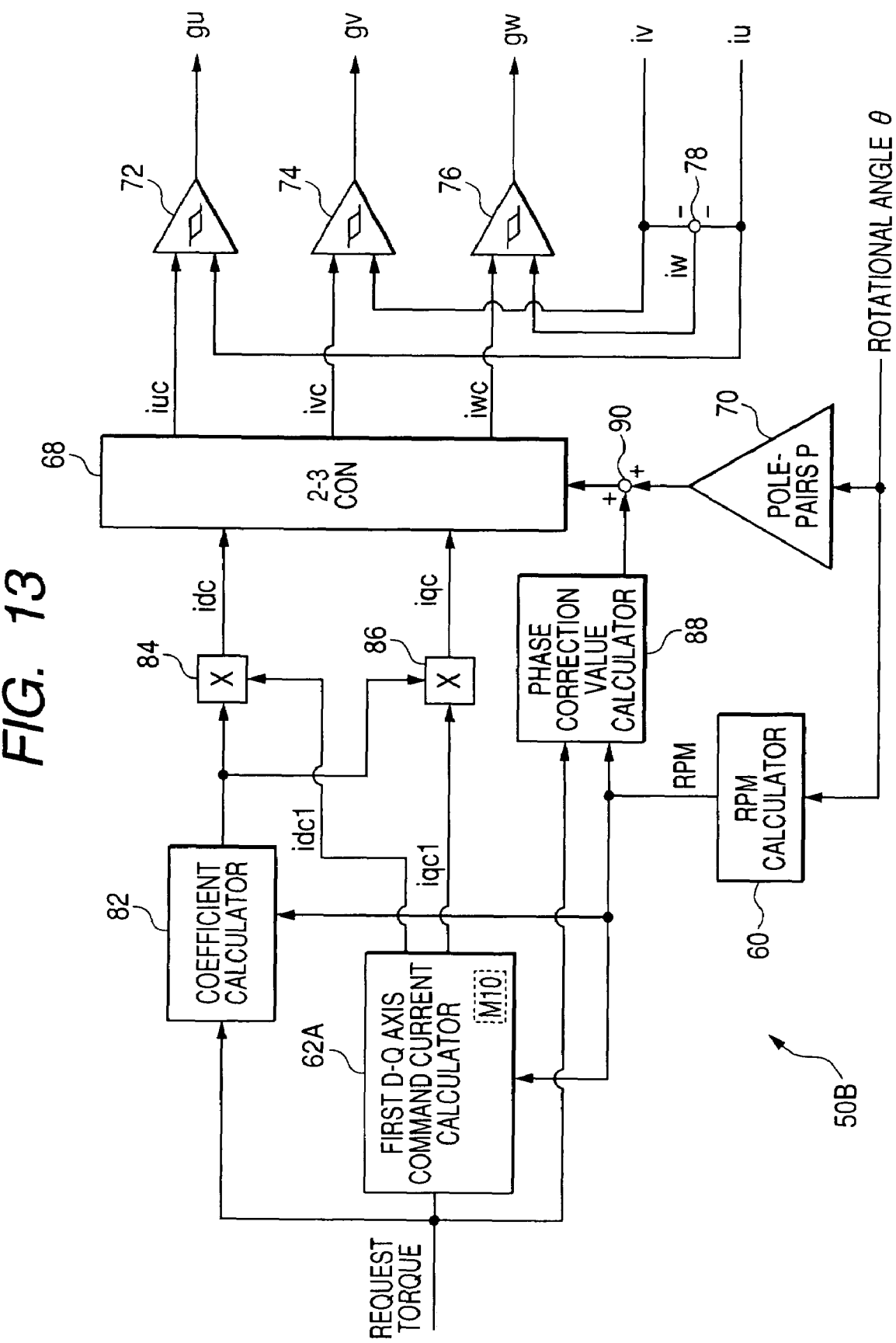
FIG. 13 is a block diagram schematically illustrating functional modules of a microcomputer equivalent to tasks to be executed thereby according to a third embodiment of the present invention.

FIG. 13 schematically illustrates functional modules of a microcomputer 50B equivalent to tasks to be executed thereby according to the third embodiment.

The microcomputer 50B includes an amplitude correction-coefficient calculator (COEFFICIENT CALCULATOR) 82, a multiplier 84, a multiplier 86, a phase correction-value calculator 88, and an adder 90 in place of the second d-q axis command current calculator 64.

Figure 14A:
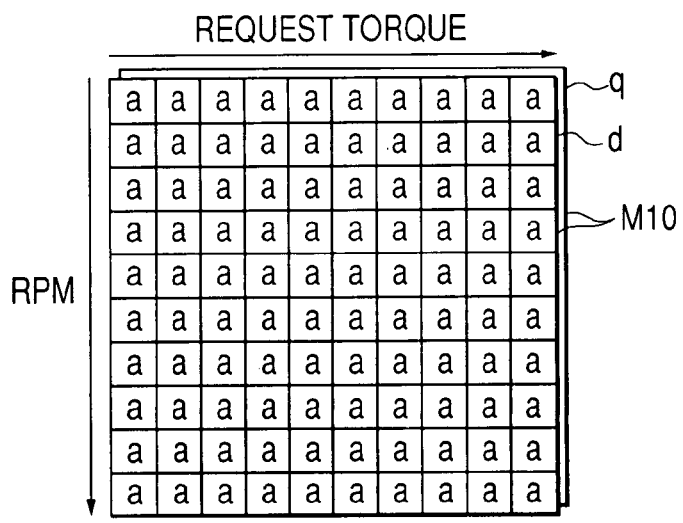
FIG. 14A is a view schematically illustrating a first command value calculating map according to the third embodiment.

A first d-q axis command current calculator 62A has first command value calculating maps M10 illustrated in FIG. 14A. One of the first command value calculating maps M10 represents a relationship between a variable of the first command value idc1, a variable of the request torque, and a variable of the RPM. The other of the first command value calculating maps M10 represents a relationship between a variable of the first command value iqc1, a variable of the request torque, and a variable of the RPM.

Specifically, the first d-q axis command current calculator 62A is configured to calculate the first command values idc1 and iqc1 based on the first command value calculating maps M10.

In the third embodiment, the second command values idc2 and iqc2 can be calculated by correcting the first command values idc1 and iqc1.

Specifically, the amplitude correction-coefficient calculator 82 works to calculate amplitude correction-coefficients based on a current input request torque and a current input RPM, and to output the calculated amplitude correction-coefficients to the multipliers 84 and 86, respectively.

The multiplier 84 works to multiply the first command value idc1 in the d-axis by the amplitude correction-coefficient output from the amplitude correction-coefficient calculator 82 to thereby generate the finally determined command value (d-axis component) idc.

The multiplier 86 works to multiply the first command value iqc1 in the q-axis by the amplitude correction-coefficient output from the amplitude correction-coefficient calculator 82 to thereby generate the finally determined command value (q-axis component) iqc.

Figure 14B:
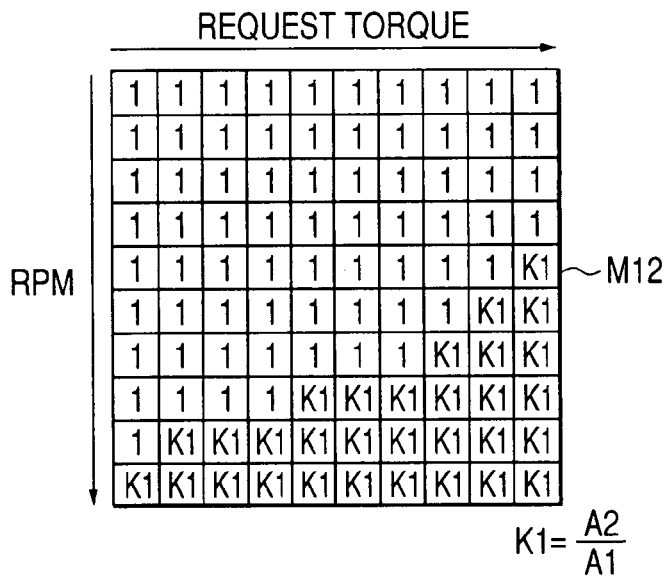
FIG. 14B is a view schematically illustrating a second command value calculating map according to the third embodiment.

Specifically, the amplitude correction-coefficient calculator 82 has a map M12 illustrated in FIG. 14B. The map M12 represents a relationship between a variable of the amplitude correction-coefficient, a variable of the request torque, and a variable of the RPM.

As illustrated in FIG. 14B, the map M12 has a first region "1" in which the amplitude correction-coefficient is set to "1" when the first instantaneous current control is switched to be carried out. The map M12 also has a second region "K1" in which the amplitude correction-coefficient is set to "K1" when the second instantaneous current control is switched to be carried out while the motor 2 operates in the high RPM and torque mode. The K1 is defined as the ratio of the amplitude A2 of each of the second three-phase command values to the amplitude A1 of a corresponding one of the first three-phase command values.

The phase correction-value calculator 88 works to calculate a phase correction value based on a current input request torque and a current input RPM, and to output the calculated phase correction value to the adder 90. The adder 90 works to calculate the sum of the calculated phase correction value and an electric angle obtained by multiplying the rotational angle θ by the number p of pole pairs of the rotor, and to output the sum of the calculated phase correction value and the electric angle to the two-phase to three-phase converter 68 as a final electric angle.

Figure 14C:
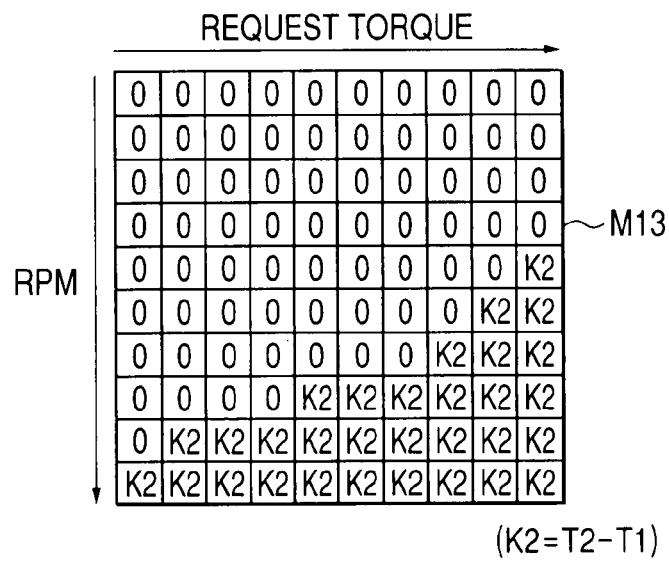
FIG. 14C is a view schematically illustrating a map according to the third embodiment.

Specifically, the phase correction-coefficient calculator 88 has a map M13 illustrated in FIG. 14C. The map M13 represents a relationship between a variable of the phase correction-coefficient, a variable of the request torque, and a variable of the RPM.

As illustrated in FIG. 14C, the map M13 has a first region "0" in which the phase correction-coefficient is set to "0" when the first instantaneous current control is switched to be carried out. The map M13 also has a second region "K2" in which the phase correction-coefficient is set to "K2" when the second instantaneous current control is switched to be carried out while the motor 2 operates in the high RPM and torque mode. The K2 is given by the following equation: "K2=T2−T1".

As described above, the control system 3 for the motor 2 according to the third embodiment can mainly achieve the following ninth effect in addition to the first to fifth effects.

Specifically, the first command values in the d and q axes corresponding to the request current values in the d and q axes can be calculated based on the first command value calculating maps M10 in response to an input request torque and an input RPM. In addition, the second command values can be calculated by correcting the first command values. This allows the request current values in the d and q axes to be easily calculated. Correction of the request current values in the d and q permits, as the ninth effect, the second command values to be easily calculated.

Fourth Embodiment

A control system for a motor according to a fourth embodiment of the present invention will be described hereinafter. The structure of the control system is substantially identical to that of the control system according to the second embodiment.

Thus, like reference characters are assigned to like parts in the control systems according to the second and fourth embodiments, and therefore, descriptions of the structure of control system according to the fourth embodiment are omitted.

Figure 15:
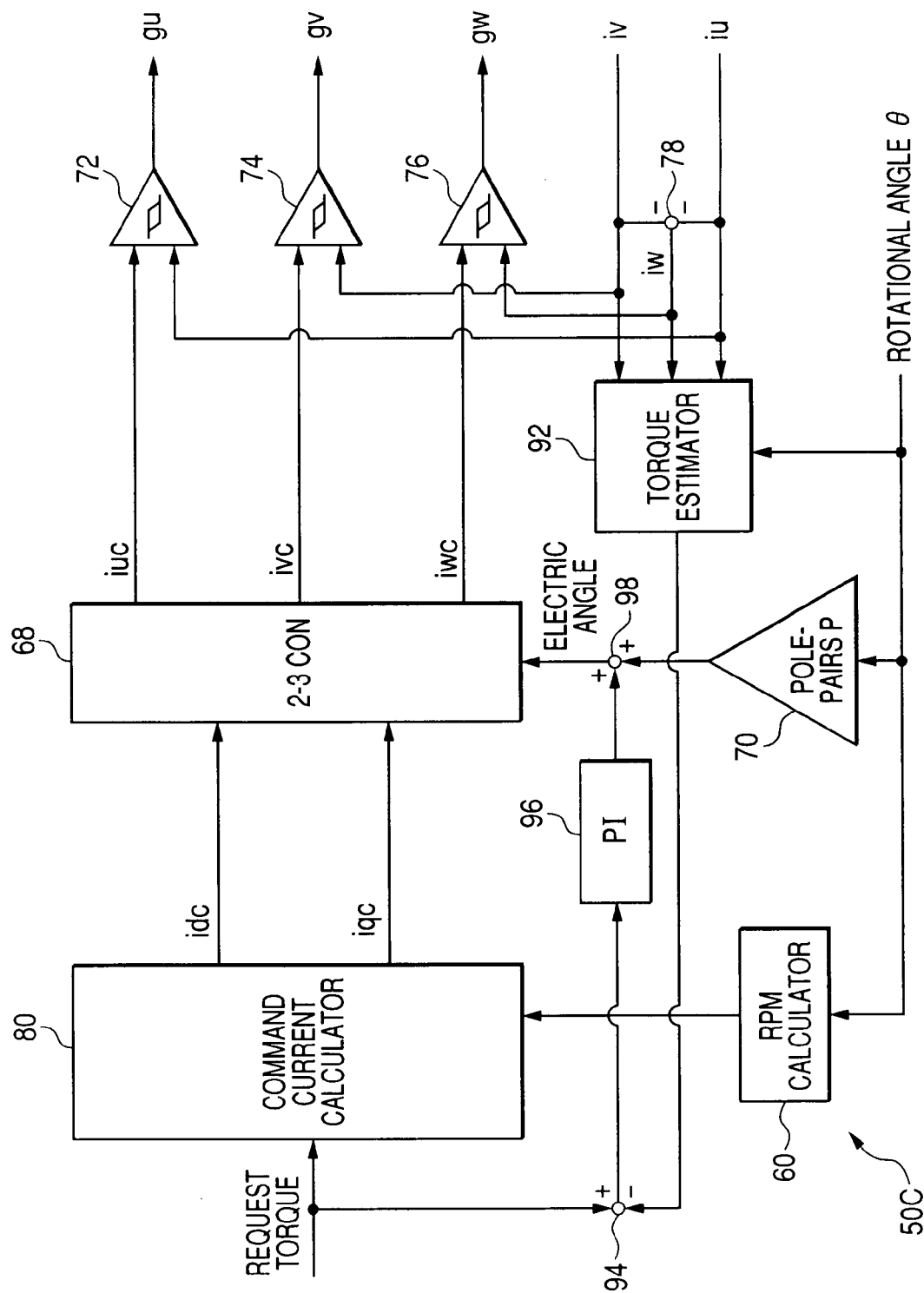
FIG. 15 is a block diagram schematically illustrating functional modules of a microcomputer equivalent to tasks to be executed thereby according to a fourth embodiment of the present invention.

FIG. 15 schematically illustrates functional modules of a microcomputer 50C equivalent to tasks to be executed thereby according to the fourth embodiment.

The microcomputer 50C includes a torque estimator 92, a deviation calculator 94, a proportional-integral (PI) controller 96, and an adder 98.

The torque estimator 92 works to estimate an output torque of the motor 2 based on the instantaneous three-phase currents iu, iv, and iw.

Figure 16:
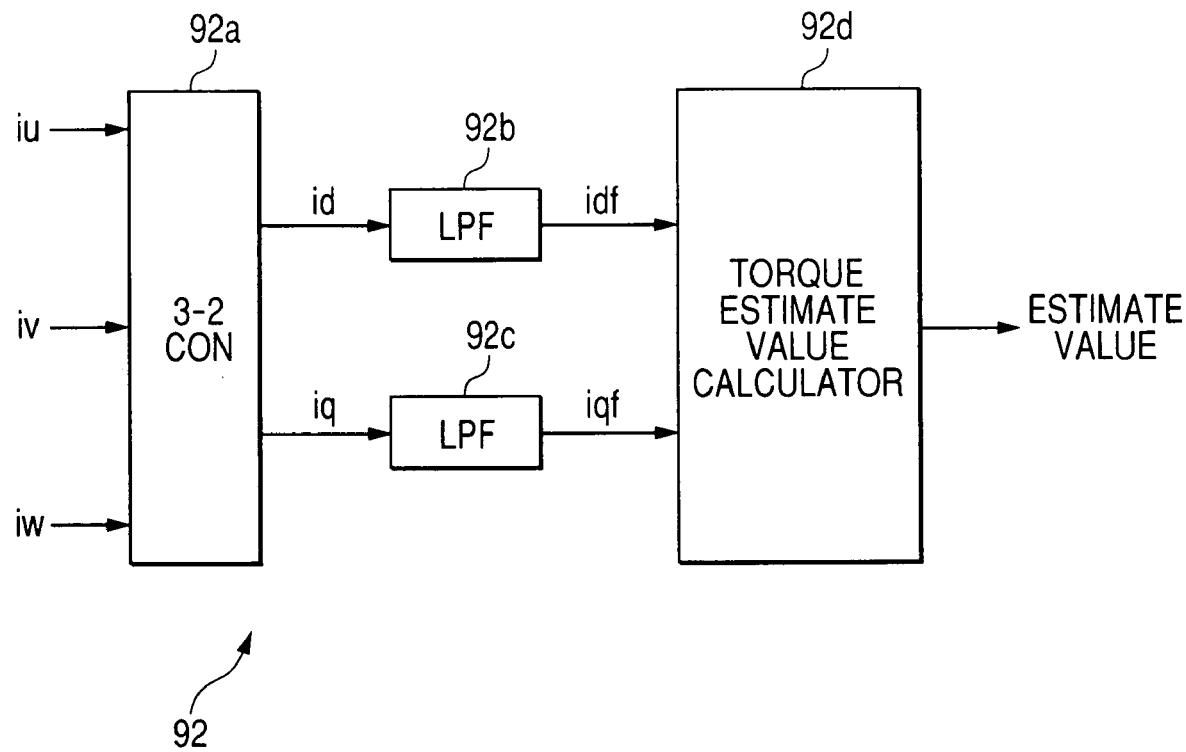
FIG. 16 is a block diagram schematically illustrating a functional block diagram of a torque estimator illustrated in FIG. 15.

Specifically, FIG. 16 schematically illustrates a functional block diagram of the torque estimator 92.

As illustrated in FIG. 16, the torque estimator 92 includes a three-phase to two-phase converter 92a (abbreviated as "3-2 CON 92a" in FIG. 16). The three-phase to two-phase converter 92a works to convert the instantaneous three-phase current values iu, iv, and iw in the stator coordinate system into d-axis component id and q-axis current component iq in the d and q axes of the rotor based on the actual rotational angle θ of the rotor and an input request torque.

The three-phase to two-phase converter 92a includes low-pass filters 92b and 92c. The low-pass filters 92b and 92c work to eliminate high-frequency components from the d-axis component id and q-axis current component iq to thereby generate d-axis component idf and q-axis current component iqf, respectively.

The torque estimator 92 also includes a torque estimate value calculator 92d to which the generated d-axis component idf and q-axis current component iqf are passed.

The torque estimate value calculator 92d works to calculate an estimate value EV of the output torque of the motor 2 based on the d-axis component idf and q-axis current component iqf. For example, the estimate value EV can be calculated using the following equation [8]:

$$EV = Kt \times iqf - (Ld - Lq) \times idf \times iqf \qquad [8]$$

where Kt represents a torque constant of the motor 2, Ld represents a d-axis inductance, and Lq represents a q-axis inductance.

The estimate value of the output torque of the motor 2 is passed to the deviation calculator 94. The deviation calculator 94 works to calculate a deviation between the request torque and the estimate value EV of the output torque and to output it to the PI controller 96.

The PI controller 96 works to calculate a proportional term and an integral term based on the deviation between the request torque and the estimate value EV of the output torque. The PI controller 96 works to output the sum of the proportional term and the integral term to the adder 98.

The adder 98 works to calculate the sum of the output value from the PI controller 96 and an electric angle obtained by multiplying the rotational angle θ by the number p of pole pairs of the rotor, and to output the sum of the output value from the PI controller 96 and the electric angle to the two-phase to three-phase converter 68 as a final electric angle.

Figure 17:
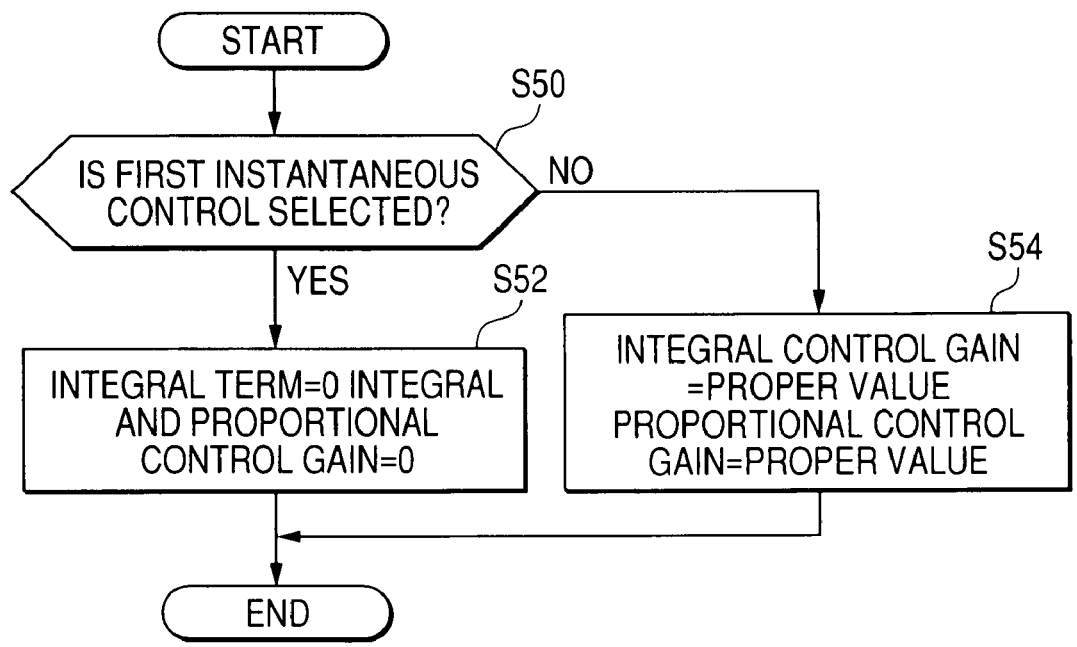
FIG. 17 is a flowchart schematically illustrating operations executed by a PI controller illustrated in FIG. 15.

FIG. 17 schematically illustrates operations executed by the PI controller 96, which are repeated at a predetermined cycle.

As illustrated in FIG. 17, the PI controller 96 determines whether the first instantaneous control is selected to be carried out in step S50.

When it is determined that the first instantaneous control is selected to be carried out (YES in step S50), the PI controller 96 sets both an integral control gain, a proportional control gain, and integral term to zero in step S52.

This can prevent the electric angle to be passed to the two-phase to three-phase converter 68 from being corrected during execution of the first instantaneous control.

Otherwise when it is determined that the second instantaneous control is selected to be carried out (NO in step S50), the PI controller 96 shifts to step S54. In step S54, the PI controller 96 individually sets the integral control gain and the proportional control gain to proper values greater than zero. Thus, the electric angle to be passed to the two-phase and three-phase converter 68 can be corrected based on the sum of the proportional term and the integral term respectively based on the integral control gain and the proportional control gain.

As described above, in the fourth embodiment, the feedback control to match the estimate value with the request torque allows the actual output torque of the motor 2 to be matched with the request torque with a high degree of accuracy.

Specifically, the second command values established based on the input request torque and RPM of the motor 2 allows the motor 2 to actually generate the request torque on conditions that the motor 2 and/or the inverter 20 has normal operating characteristics.

However, the motor 2 and/or the inverter has actual operating characteristics different from the normal operating characteristics due to individual differences, deterioration over time, and/or the dependence of the operating characteristics on temperature. In this case, because the second instantaneous current control using the second command values are designed to be adapted to the normal operating characteristics of the motor 2 and/or the inverter 10, it may be difficult to match the actual output torque with the request torque.

In contrast, in the fourth embodiment, the PI feedback control to match the estimate value of the output torque of the motor 2 with the request torque allows the output torque to be matched with the request torque with a high degree of accuracy. Especially, the use of the integral control can compensate for the deviation between the estimate value and the request torque under normal operation of the motor 2.

Under transient operation of the motor 2, directions of the deviations between the estimate value and the request torque are changed, so that the mount of correction in the phase of each of the second command values is changed. Even under transient operation of the motor 2, as long as there is the deviation between the estimate value and the request torque, the integral control must increase the absolute value of the integral term so as to reduce the deviation. For this reason, the absolute value of the integral term may be excessively greater than a proper range of the absolute value of the integral term during transient operation of the motor 2. Thus, when the motor 2 is shifted from the transient operation to the normal operation, the output torque may overshoot the request torque or undershoot it.

In order to address the problem caused under transient operation of the motor 2, the PI controller 96 is designed to initialize the integral term under transient operation of the motor 2. The initializing operations will be described hereinafter.

Figure 18:
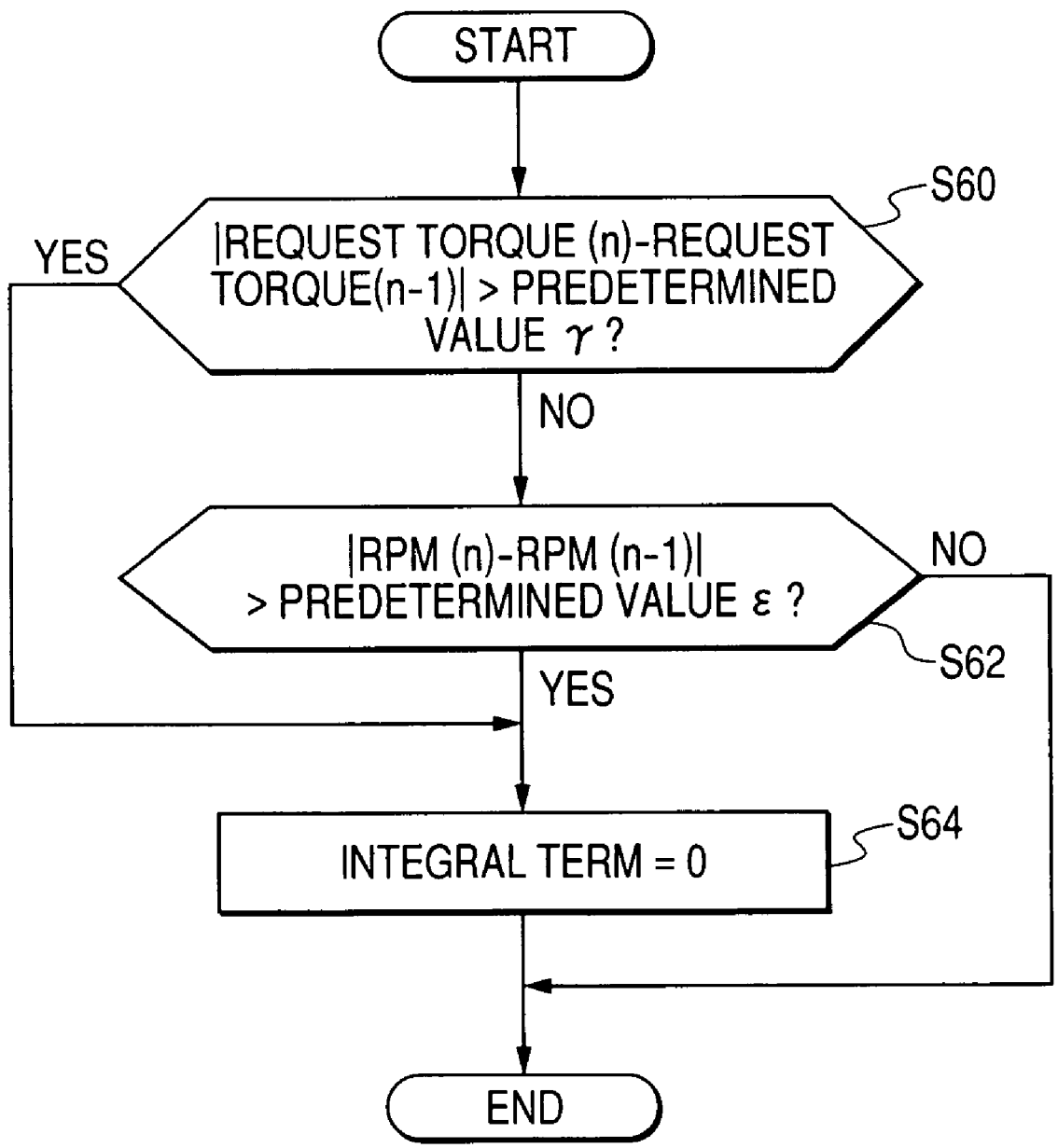
FIG. 18 is a flowchart schematically illustrating an initializing task executed by the PI controller.

FIG. 18 schematically illustrates the initializing task executed by the PI controller 96, which is repeated at a predetermined cycle.

In step S60, the PI controller 96 calculates an absolute difference between a current request torque (n) and a previous request torque (n−1) one cycle before the current request torque to determine the calculated absolute difference is greater than a predetermined value γ. Note that the n is an integer greater than 1, and the predetermined value γ is set to a value that allows determination of whether the actual output torque is estimated to be remarkably delayed in response from the request torque due to transient operation of the motor 2.

Next, in step S62, the PI controller 96 calculates an absolute difference between a current RPM (n) and a previous RPM (n−1) one cycle before the current RPM (n) to determine the calculated absolute difference is greater than a predetermined value ε. Note that the predetermined value ε is set to a value that allows determination of variation of RPM due to transient operation of the motor 2.

When any one of the determinations in steps S60 and S62 is affirmative, the PI controller 60 initializes the integral term to zero in step S64. Thereafter, when the calculated absolute difference between the current request torque (n) and the previous request torque (n−1) is equal to or lower than the predetermined value γ, and the calculated absolute difference between the current RPM (n) and the previous RPM (n−1) is equal to or lower than the predetermined value ε, the integral term is calculated again by the operations of the PI controller 96 illustrated in FIG. 17.

As described above, the control system 3 for the motor 2 according to the fourth embodiment can mainly achieve the following tenth to twelfth effects in addition to the first to eighth effects.

Specifically, feedback correction of the phase of each of the second command values based on the deviation between the estimate value and the request torque allows a power factor of the motor 2 to be adjusted. This makes it possible to properly compensate for the deviation between the actual output torque and the request torque as the tenth effect.

In addition, the integral control based on the deviation between the request torque and the estimate value can compensate for the deviation between the estimate value and the request torque under normal operation of the motor 2 as the eleventh effect.

When at least one of the amount of change in the RPM of the motor 2 and that of change in the request torque is greater than a predetermined value, the integral term in the PI control is reset to zero. This can prevent the absolute value of the integral term from being excessively increased during transient operation of the motor 2, making it possible to prevent the output torque from overshooting or undershooting the request torque.

Fifth Embodiment

A control system for a motor according to a fifth embodiment of the present invention will be described hereinafter. The structure of the control system is substantially identical to that of the control system according to the fourth embodiment.

Thus, like reference characters are assigned to like parts in the control systems according to the fourth and fifth embodiments, and therefore, descriptions of the structure of control system according to the fifth embodiment are omitted.

Figure 19:
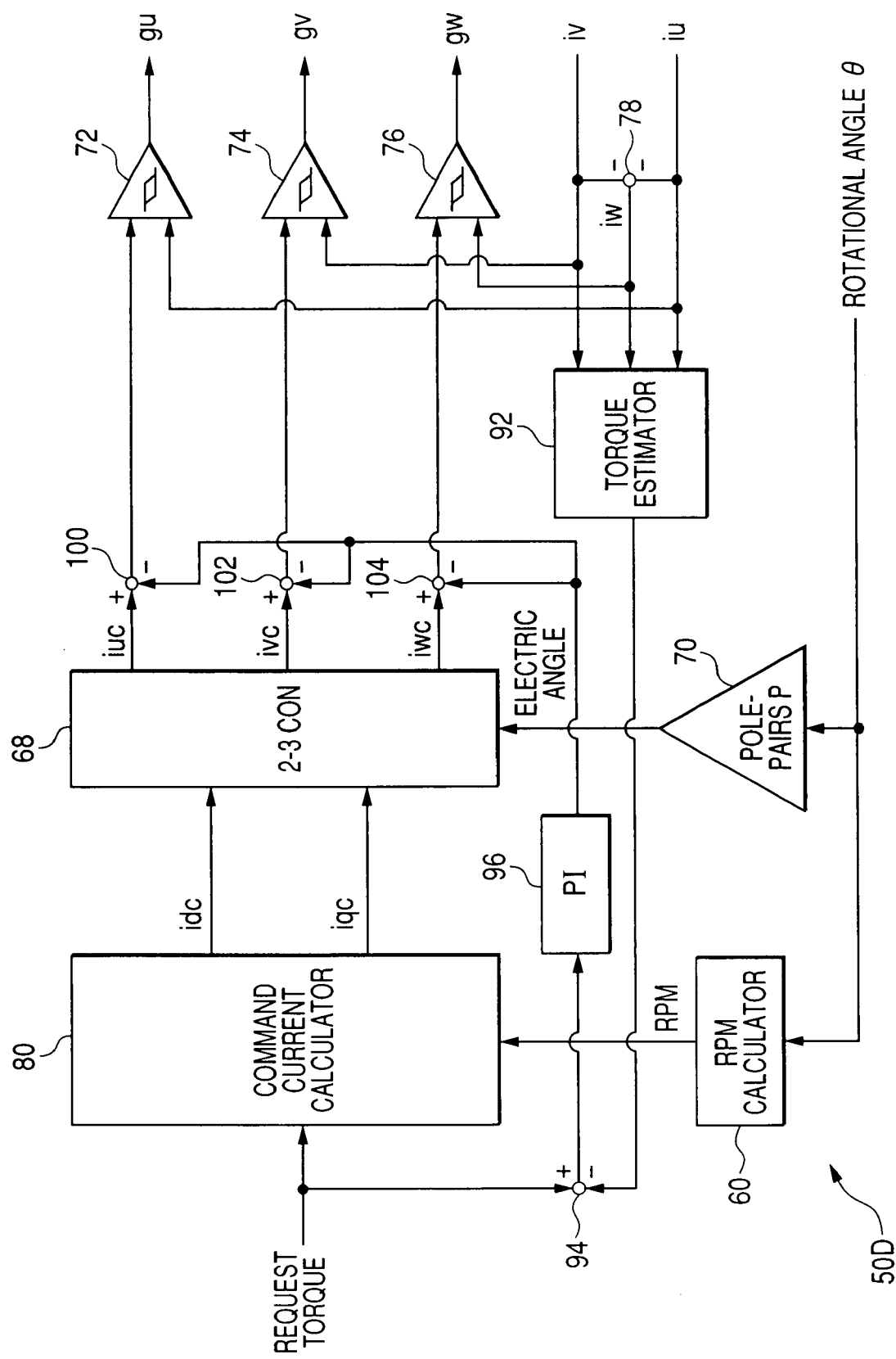
FIG. 19 is a block diagram schematically illustrating functional modules of a microcomputer equivalent to tasks to be executed thereby according to a fifth embodiment of the present invention.

FIG. 19 schematically illustrates functional modules of a microcomputer 50D equivalent to tasks to be executed thereby according to the fifth embodiment.

The microcomputer 50D according to the fifth embodiment is configured to correct the center of the hysteresis region based on the deviation between the actual output torque of the motor 2 and the request torque; this center of the hysteresis region is determined based on each of the U-, V-, and W-phase command currents iuc, ivc, and iuw.

Specifically, the microcomputer 50D includes correction modules 100, 102, and 104 in place of the adder 98. The output values of the PI controller 96 are respectively passed to the correction modules 100, 102, and 104. In addition, the U-, V-, and W-phase command values iuc, ivc, and iwc are passed to the correction modules 100, 102, and 104, respectively.

The correction modules 100, 102, and 104 respectively work to subtract the output values from the PI controller 96 from the U-, V-, and W-phase command values iuc, ivc, and iwc, respectively, thereby respectively outputting the subtraction results to the hysteresis comparators 72, 74, and 76. This allows feedback correction of the hysteresis regions for the respective phases established by the corresponding U-, V-, and W-phase command values iuc, ivc, and iwc. Thus, it is possible to finely adjust the switching timing of each of the switching elements 12, 14, 16, 18, 20, and 22.

As described above, the control system 3 for the motor 2 according to the fifth embodiment can mainly achieve the following thirteenth effect in addition to the first to eighth, eleventh, and twelfth effects.

Specifically, feedback correction of the center of the hysteresis region for each phase based on the deviation between the estimate value and the request torque allows the switching timing of each of the switching elements 12, 14, 16, 18, 20, and 22 to be finely adjusted. This makes it possible to properly compensate for the deviation between the actual output torque and the request torque.

Sixth Embodiment

A control system for a motor according to a sixth embodiment of the present invention will be described hereinafter. The structure of the control system is substantially identical to that of the control system 3 according to the third embodiment.

Thus, like reference characters are assigned to like parts in the control systems according to the third and sixth embodiments, and therefore, descriptions of the structure of control system according to the sixth embodiment are omitted.

Figure 20:
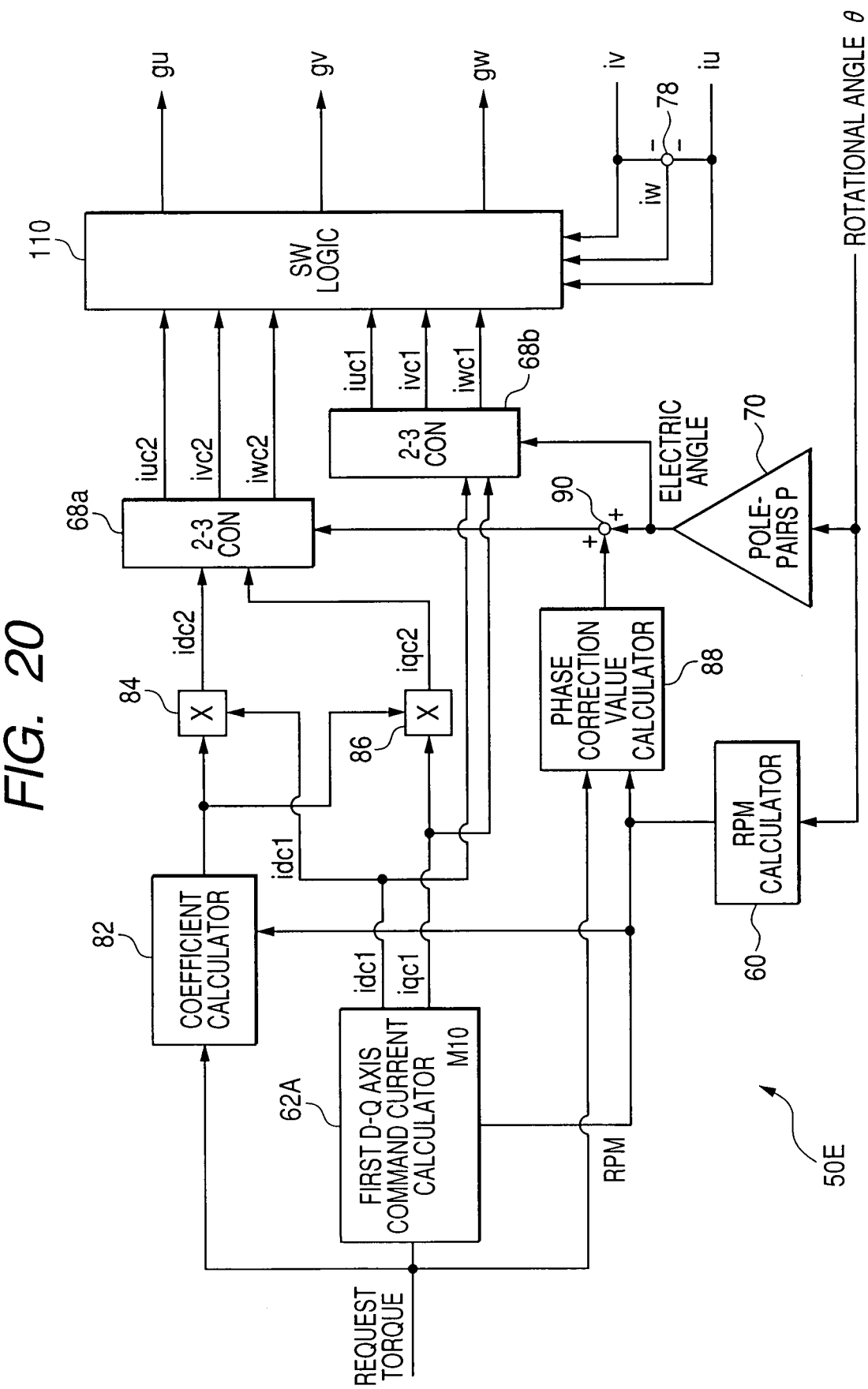
FIG. 20 is a block diagram schematically illustrating functional modules of a microcomputer equivalent to tasks to be executed thereby according to a sixth embodiment of the present invention.

FIG. 20 schematically illustrates functional modules of a microcomputer 50E equivalent to tasks to be executed thereby according to the sixth embodiment.

In each of the first to fifth embodiments, the second instantaneous current control using the second command values is selected while the motor 2 operates in the high RPM and torque mode in which both the request torque is greater in magnitude than the predetermined torque α and the RPM of the motor 2 is higher than the predetermined RPM β.

The second instantaneous current control is equivalent to the single pulse control, which can theoretically maximize the voltage utilization factor of the inverter 10.

For this reason, switching to the second command values from the first command values may cause the voltage utilization factor to intermittently increase. This may cause the output torque generated by the motor 2 to intermittently change, subjecting at least one occupant to a shock (torque shock).

In order to address the concerns, after switching to the second command values from the first command values, the microcomputer 50E according to the sixth embodiment is configured to carry out the following operations. Specifically, when at least one of the U-, V-, and W-phase instantaneous currents iu, iv, and iw goes out of the hysteresis region established by the first command values iuc1, ivc1, and iwc1, the microcomputer 50E switches, for at least one of the U-, V-, and W-phases, the second instantaneous control to the first instantaneous control using the first command values iuc1, ivc1, and iwc1.

After the control switching, when the at least one of the instantaneous currents iu, iv, and iw is returned within the hysteresis region, the microcomputer 50E returns control for the at least one of the U-, V-, and W-phase instantaneous currents iu, iv, and iw to the second instantaneous control using the second command values iuc2, ivc2, and iwc2.

Specifically, the microcomputer 50E includes a first two-phase to three-phase converter 68a and a second two-phase to three-phase converter 68b in place of the two-phase to three-phase converter 68. The microcomputer 50E also includes a switching-signal determining logic (SW LOGIC in FIG. 20) 110 in place of the hysteresis comparators 72, 74, and 76.

Like the third embodiment, the second command values (d-axis component and q-axis component) idc2 and iqc2 are generated by the amplitude correction-coefficient calculator 82, and the multipliers 84 and 86 using the map M12. The second command values idc2 and iqc2 are passed to the first two-phase to three-phase converter 68a to be converted into the second three-phase command values iuc2, ivc2, and iwc2.

The first command values (d-axis component and q-axis component) idc1 and iqc1 are generated by the first d-q axis command current calculator 62A based on the first command value calculating maps M10. The first command values idc1 and iqc1 are passed to the second two-phase to three-phase converter 68b to be converted into the first three-phase command values iuc1, ivc1, and iwc1.

As described in the third embodiment, because the second three-phase command values iuc2, ivc2, and iwc2 are calculated based on the map M12 illustrated in FIG. 14B, they are equivalent to the first three-phase command values iuc1, ivc1, and iwc1 while the motor 2 operates in the low RPM/torque mode except for the high RPM and torque mode.

The second three-phase command values iuc2, ivc2, and iwc2 and the first three-phase command values iuc1, ivc1, and iwc1 are passed to the switching signal determining logic 110.

The switching signal determining logic 110 works to carry out instantaneous current control by comparison in magnitude between:

the upper and lower limits of the hysteresis region established by each of the second three-phase command values iuc2, ivc2, and iwc2;

the upper and lower limits of the hysteresis region established by each of the first three-phase command values iuc1, ivc1, and iwc1; and each of the three-phase instantaneous current values iu, iv, and iw.

The switching signal determining logic 110 also works to switch control for at least one of the U-, V-, and W-phases, between the first and second instantaneous controls.

Figure 21:
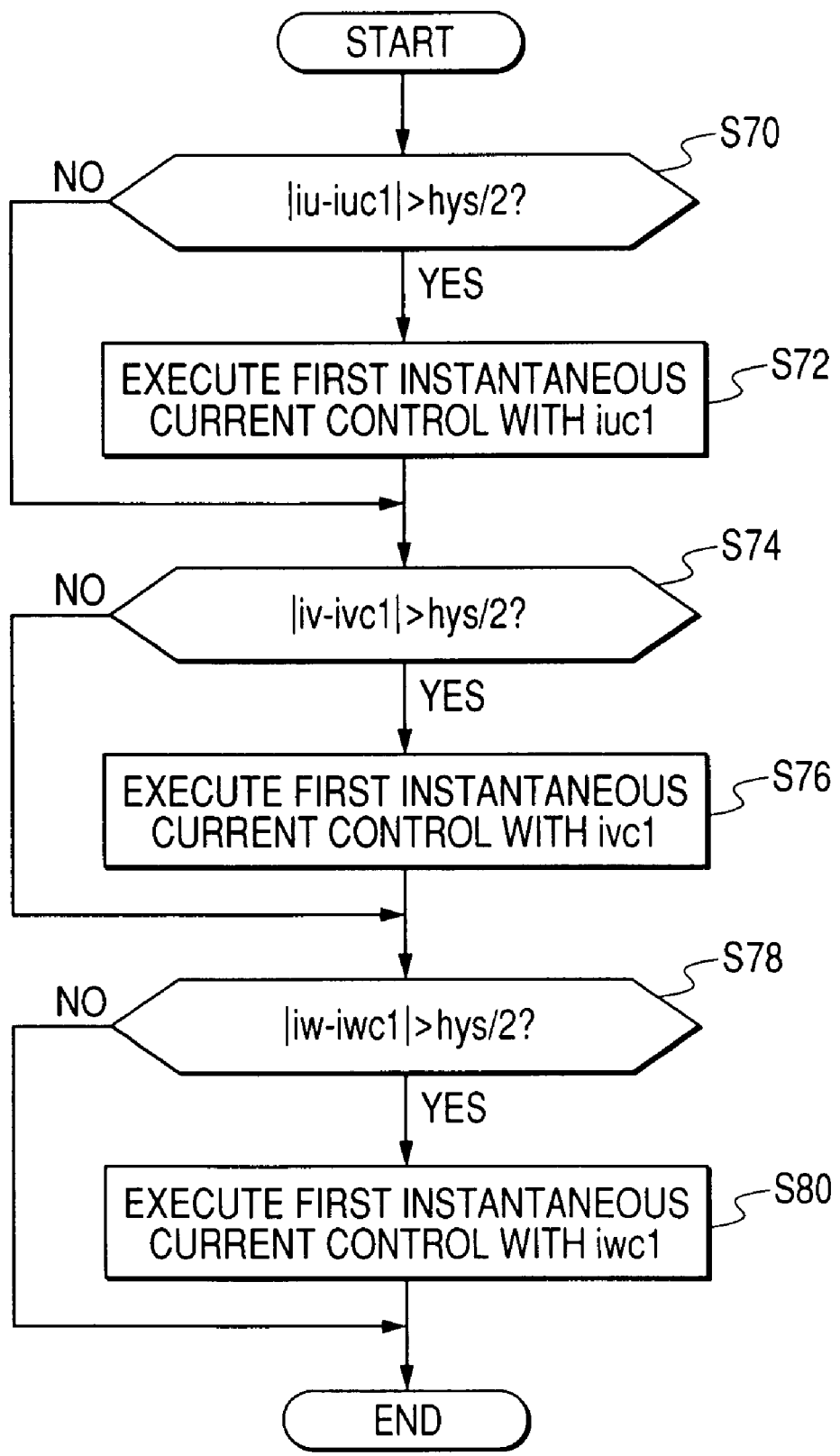
FIG. 21 is a flowchart schematically illustrating a control switching task executed by a switching signal determining logic illustrated in FIG. 20.

FIG. 21 schematically illustrates the control switching task executed by the switching signal determining logic, which will be referred to as "determining logic", 110. The control switching task is repeated at a predetermined cycle.

In step S70, the determining logic 110 calculates the absolute difference between the U-phase instantaneous current value iu and the first U-phase command value iuc1. Then, the determining logic 110 determines whether the calculated absolute difference "|iu−iuc1|" is higher in level than the half of the hysteresis width (hys) whose center is established by the profile of the first U-phase command value iuc1.

When it is determined that the calculated absolute difference "|iu−iuc1|" is higher in level than the half of the hysteresis width (the determination in step S70 is YES), the determining logic 110 carries out the first instantaneous current control for the U-phase instantaneous current value iu based on the first U-phase command value iuc1 (step S72).

Otherwise when it is determined that the calculated absolute difference "|iu−iuc1|" is equal to or lower in level than the half of the hysteresis width (hys) (the determination in step S70 is NO), the determining logic 110 proceeds to step S74.

In step S74, the determining logic 110 calculates the absolute difference between the V-phase instantaneous current value iv and the first V-phase command value ivc1. Then, the determining logic 110 determines whether the calculated absolute difference "|iv−ivc1|" is higher in level than the half of the hysteresis width whose center is established by the profile of the first V-phase command value ivc1.

When it is determined that the calculated absolute difference "|iv−ivc1|" is higher in level than the half of the hysteresis width (the determination in step S74 is YES), the determining logic 110 carries out the first instantaneous current control for the V-phase instantaneous current value iv based on the first V-phase command value ivc1 (step S76).

Otherwise when it is determined that the calculated absolute difference "|iv−ivc1|" is equal to or lower in level than the half of the hysteresis width (the determination in step S74 is NO), the determining logic 110 proceeds to step S78.

In step S78, the determining logic 110 calculates the absolute difference between the W-phase instantaneous current value iw and the first W-phase command value iwc1. Then, the determining logic 110 determines whether the calculated absolute difference "|iw−iwc1|" is higher in level than the half of the hysteresis width whose center is established by the profile of the first W-phase command value iwc1.

When it is determined that the calculated absolute difference "|iw−iwc1|" is higher in level than the half of the hysteresis width (the determination in step S78 is YES), the determining logic 110 carries out the first instantaneous current control for the W-phase instantaneous current value iw based on the first W-phase command value iwc1 (step S80).

Otherwise when it is determined that the calculated absolute difference "|iw−iwc1|" is equal to or lower in level than the half of the hysteresis width (the determination in step S78 is NO), the determining logic 110 exits the control switching task. For convenience of descriptions, the operations in steps S70, S74, and S78 are sequentially carried out, but can be simultaneously carried out.

Figure 22:
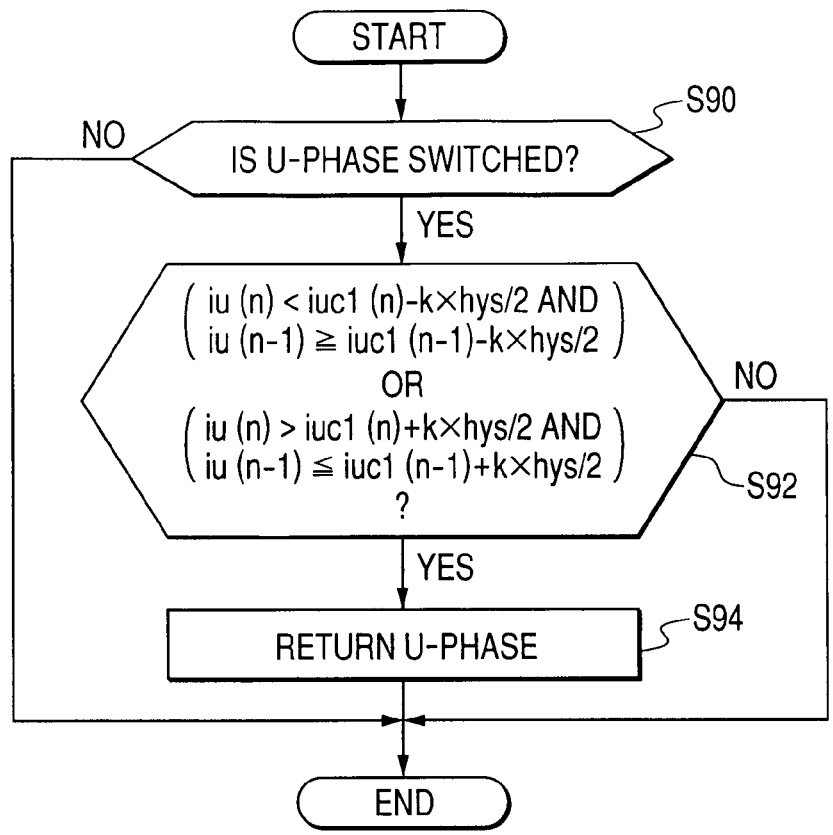
FIG. 22 is a flowchart schematically illustrating a control returning task to a second instantaneous control after completion of at least one of the operations in S72, S76, and S80 illustrated in FIG. 21.

FIG. 22 schematically illustrates the control returning task to the second instantaneous control after completion of at least one of the operations in steps S72, S76, and S80. The control returning task is executed by the determining logic 110 and is repeated at a predetermined cycle.

Note that, in FIG. 22, the control returning task for the U-phase is only illustrated, but the control returning tasks for the V- and W-phases can be carried out as well as the control returning task for the U-phase. Specifically, when the control returning task illustrated in FIG. 22 is applied to the V-phase, the "U-phase" in FIG. 22 is replaced with the "V-phase", the "iu" is replaced with "iv", and the "iuc1" is replaced with "ivc1". Similarly, when the control returning task illustrated in FIG. 22 is applied to the W-phase, the "U-phase" in FIG. 22 is replaced with the "W-phase", the "iu" is replaced with "iw", and the "iuc1" is replaced with "iwc1".

In step S90, the determining logic determines whether the second instantaneous current control using the second command value iuc2 has been switched to the first instantaneous current control using the first command value iuc1 in the U-phase.

When it is determined that the second instantaneous current control using the second command value iuc2 has been switched to the first instantaneous current control (the determination in step S90 is YES), the determining logic 110 proceeds to step S92.

In step S92, the determining logic 110 waits until the instantaneous current iu is passed through a narrow hysteresis width "hys×k". The narrow hysteresis width has a center established by the profile of the first command value iuc1 and a width narrower than the hysteresis width "hys" used in each of the first and second instantaneous current controls. "k" is determined such that the absolute value of "k" is greater than "0" and less than "1", which is represented by the equation: "0<|k|<1".

The operation in step S92 is equivalent to determine whether the output of a hysteresis comparator with the narrow hysteresis width is revered. In other words, the operation in step S92 is equivalent to determine whether to switch the first instantaneous current control to the second instantaneous current control by determining whether the instantaneous current iu follows the first command value iuc1.

Specifically, the determining logic 110 determines whether at least one of first and second requirements is satisfied. The first requirement is that:

an actual instantaneous current value iu(n) is lower in level than a value obtained by subtracting the half of the narrow hysteresis width "hys×k" from an actual first command value iuc1(n); and a previous instantaneous current value iu(n−1) one cycle before the current value iu(n) is equal to or greater than a value obtained by subtracting the half of the narrow hysteresis width "hys×k" from a previous first command value iuc1(n−1).

The second requirement is that:

the actual instantaneous current value iu(n) is higher in level than a value obtained by the sum of the half of the narrow hysteresis width "hys×k" and the actual first command value iuc1(n); and the previous instantaneous current value iu(n−1) is equal to or lower than a value obtained by the sum of the half of the narrow hysteresis width "hys×k" and the previous first command value iuc1(n−1).

As illustrated by "first returning requirement" in FIG. 25 hereinafter, when it is determined that the instantaneous current iu is passed through the narrow hysteresis width "hys×k", (the determination in step S92 is YES), the determining logic 110 proceeds to step S94. In step S94, the determining logic 110 returns control for the U-phase instantaneous current iu to the second instantaneous control using the second command value iuc2 in step S94.

As described above, the control system 3 for the motor 2 according to the sixth embodiment can mainly achieve the following fourteenth to sixteenth effects in addition to the first to fifth effects and the ninth effect.

Specifically, under execution of the second instantaneous current control using the second command values iuc2, ivc2, and iwc2 corresponding to the high RPM and torque mode of the motor 2, the determining logic 110 determines that at least one of the instantaneous currents iu, iv, and iw goes out of the hysteresis width "hys".

In response to the determination, the determining logic 110 forcibly changes the second instantaneous current control to the first instantaneous current control using a corresponding at least one of the first command values iuc1, ivc1, and iwc1. This makes it possible to, as the fourteenth effect, properly prevent torque shock from occurring.

After the control switching, when the at least one of the instantaneous currents iu, iv, and iw is returned to follow a corresponding first command value, as the fifteenth effect, the determining logic 110 can properly return control for a corresponding instantaneous current to the second instantaneous current control that is desired during the high RPM and torque mode of the motor 2.

After the control switching, when the at least one of the instantaneous currents iu, iv, and iw is passed through the narrow hysteresis width "hys×k", the determining logic 110 can properly return control for a corresponding instantaneous current to the second instantaneous current control that is desired during the high RPM and torque mode of the motor 2.

This makes it possible to properly determine that the at least one of the instantaneous currents iu, iv, and iw follows a corresponding one of the first command values iuc1, ivc1, and iwc1 to thereby return control for a corresponding instantaneous current to the second instantaneous current control.

Seventh Embodiment

A control system for a motor according to a seventh embodiment of the present invention will be described hereinafter. The structure of the control system is substantially identical to that of the control system 3 according to the sixth embodiment.

Thus, like reference characters are assigned to like parts in the control systems according to the sixth and seventh embodiments, and therefore, descriptions of the structure of control system according to the seventh embodiment are omitted.

Figure 23:
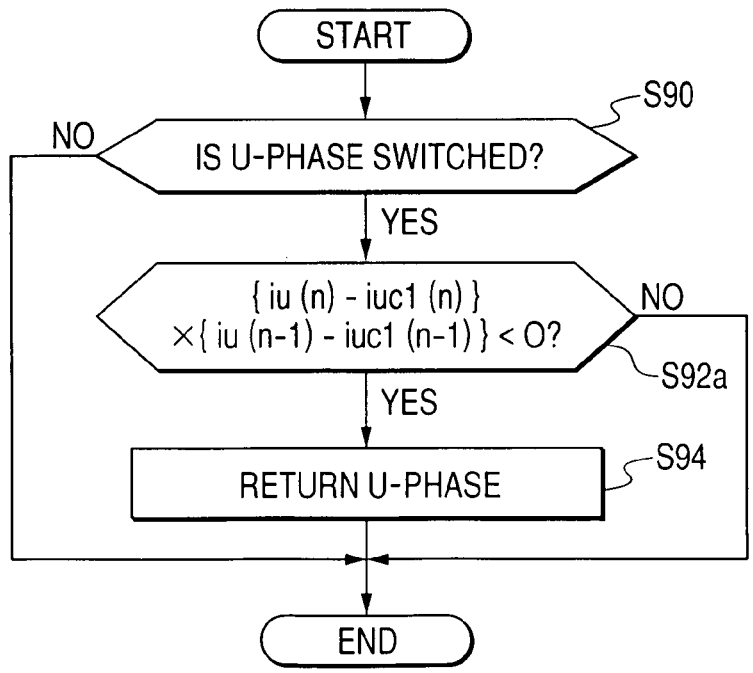
FIG. 23 is a flowchart schematically illustrating a control returning task to the second instantaneous control after completion of at least one of the operations S72, S76, and S80 illustrated in FIG. 21 according to a seventh embodiment of the present invention.

FIG. 23 schematically illustrates a control returning task to the second instantaneous control after completion of at least one of the operations S72, S76, and S80 according to the seventh embodiment. The control returning task is executed by the determining logic 110 and is repeated at a predetermined cycle.

Note that, in FIG. 23, the control returning task for the U-phase is only illustrated, but the control returning tasks for the V- and W-phases can be carried out as well as the control returning task for the U-phase.

In step S90, the determining logic determines whether the second instantaneous current control using the second command value iuc2 has been switched to the first instantaneous current control using the first command value iuc1 in the U-phase.

When it is determined that the second instantaneous current control using the second command value iuc2 has been switched to the first instantaneous current control (the determination in step S90 is YES), the determining logic 110 proceeds to step S92a.

In step S92a, the determining logic 110 determines whether the instantaneous current iu intersects with the first command value iuc1. In other words, the operation in step S92a is equivalent to determine whether to switch the first instantaneous current control to the second instantaneous current control by determining whether the instantaneous current iu follows the first command value iuc1.

Specifically, in step S92a, the determining logic 110 calculates a first value by subtracting an actual first command value $iuc1(n)$ from an actual instantaneous current value $iu(n)$. In addition, the determining logic 110 calculates a second value by subtracting a previous first command value $iuc1(n-1)$ one cycle before the actual first command value $iuc1(n)$ from a previous instantaneous current value $iu(n-1)$ one cycle before the actual instantaneous current value $iu(n)$.

Then, in step S92a, the determining logic 110 obtains the product of the first value and the second value, and determines whether the product of the first and second values is less than zero.

As illustrated by "second returning requirement" in FIG. 25 hereinafter, when it is determined that the product of the first and second values is less than zero (the determination in step S92a is YES), the determining logic 110 determines that the instantaneous current iu intersects with the first command value iuc1.

Then, in step S94, the determining logic 110 returns control for the U-phase instantaneous current iu to the second instantaneous control using the second command value iuc2.

As described above, the control system 3 for the motor 2 according to the seventh embodiment can mainly achieve the following seventeenth effect in addition to the first to fifth effects, the ninth effect, and the fourteenth and fifteenth effects.

Specifically, after the second instantaneous current control for at least one instantaneous current is switched to the first instantaneous current control, when the at least one instantaneous current intersects with a corresponding first command value, the determining logic 110 can properly return control for the at least one instantaneous current to the second instantaneous current control that is desired during the high RPM and torque mode of the motor 2. This makes it possible to properly determine that the at least one instantaneous current follows a corresponding first command value to thereby return control for the at least one instantaneous current to the second instantaneous current control.

Eighth Embodiment

A control system for a motor according to an eighth embodiment of the present invention will be described hereinafter. The structure of the control system is substantially identical to that of the control system 3 according to the sixth embodiment.

Thus, like reference characters are assigned to like parts in the control systems according to the sixth and eighth embodiments, and therefore, descriptions of the structure of control system according to the eighth embodiment are omitted.

Figure 24:
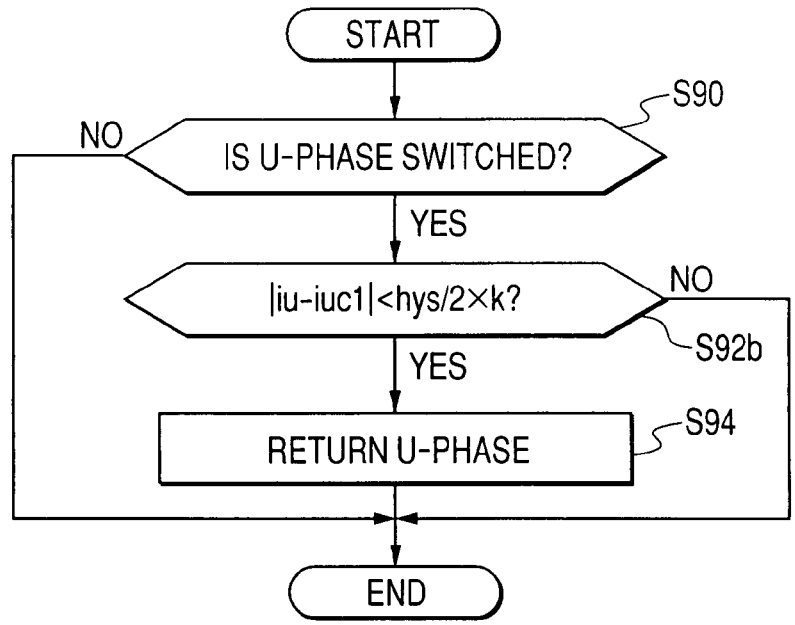
FIG. 24 is a flowchart schematically illustrating a control returning task to the second instantaneous control after completion of at least one of the operations S72, S76, and S80 illustrated in FIG. 21 according to an eighth embodiment of the present invention.

FIG. 24 schematically illustrates a control returning task to the second instantaneous control after completion of at least one of the operations S72, S76, and S80 according to the eighteenth embodiment. The control returning task is executed by the determining logic 110 and is repeated at a predetermined cycle.

Note that, in FIG. 24, the control returning task for the U-phase is only illustrated, but the control returning tasks for the V- and W-phases can be carried out as well as the control returning task for the U-phase.

In step S90, the determining logic determines whether the second instantaneous current control using the second command value iuc2 has been switched to the first instantaneous current control using the first command value iuc1 in the U-phase.

When it is determined that the second instantaneous current control using the second command value iuc2 has been switched to the first instantaneous current control (the determination in step S90 is YES), the determining logic 110 proceeds to step S92b.

In step S92b, the determining logic 110 determines whether the instantaneous current iu goes into the narrow hysteresis region established by the first command value iuc1. In other words, the operation in step S92b is equivalent to determine whether to switch the first instantaneous current control to the second instantaneous current control by determining whether the instantaneous current iu follows the first command value iuc1.

Specifically, in step S92b, the determining logic 110 calculates a value by subtracting an actual first command value iuc1 from an actual instantaneous current value iu. Then, the determining logic 110 determines whether the calculated value |iu−iuc1| is less than the half of the narrow hysteresis width "hys×k".

As illustrated by "third returning requirement" in FIG. 25 hereinafter, when it is determined that the calculated value |iu−iuc1| is less than the half of the narrow hysteresis width "hys×k" (the determination in step S92b is YES), the determining logic 110 determines that the instantaneous current iu goes into the narrow hysteresis region established by the first command value iuc1.

Then, in step S94, the determining logic 110 returns control for the U-phase instantaneous current iu to the second instantaneous control using the second command value iuc2.

As described above, the control system 3 for the motor 2 according to the eighth embodiment can mainly achieve the following eighteenth effect in addition to the first to fifth effects, the ninth effect, and the fourteenth and fifteenth effects.

Specifically, after the second instantaneous current control for at least one instantaneous current is switched to the first instantaneous current control, when the at least one instantaneous current goes into the narrow hysteresis region established by a corresponding first command value, the determining logic 110 can properly return control for the at least one instantaneous current to the second instantaneous current control that is desired during the high RPM and torque mode of the motor 2. This makes it possible to properly determine that the at least one instantaneous current follows a corresponding first command value to thereby return control for the at least one instantaneous current to the second instantaneous current control.

Ninth Embodiment

A control system for a motor according to a ninth embodiment of the present invention will be described hereinafter. The structure of the control system is substantially identical to that of the control system 3 according to the sixth embodiment.

Thus, like reference characters are assigned to like parts in the control systems according to the sixth and ninth embodiments, and, therefore, descriptions of the structure of control system according to the ninth embodiment are omitted.

The returning tasks described in the sixth to eighth embodiments are all carried out when at least one of the instantaneous currents iu to iw follows a corresponding one of the first command values iuc1 to iwc1, but their returning timings are different from each other.

Figure 25:
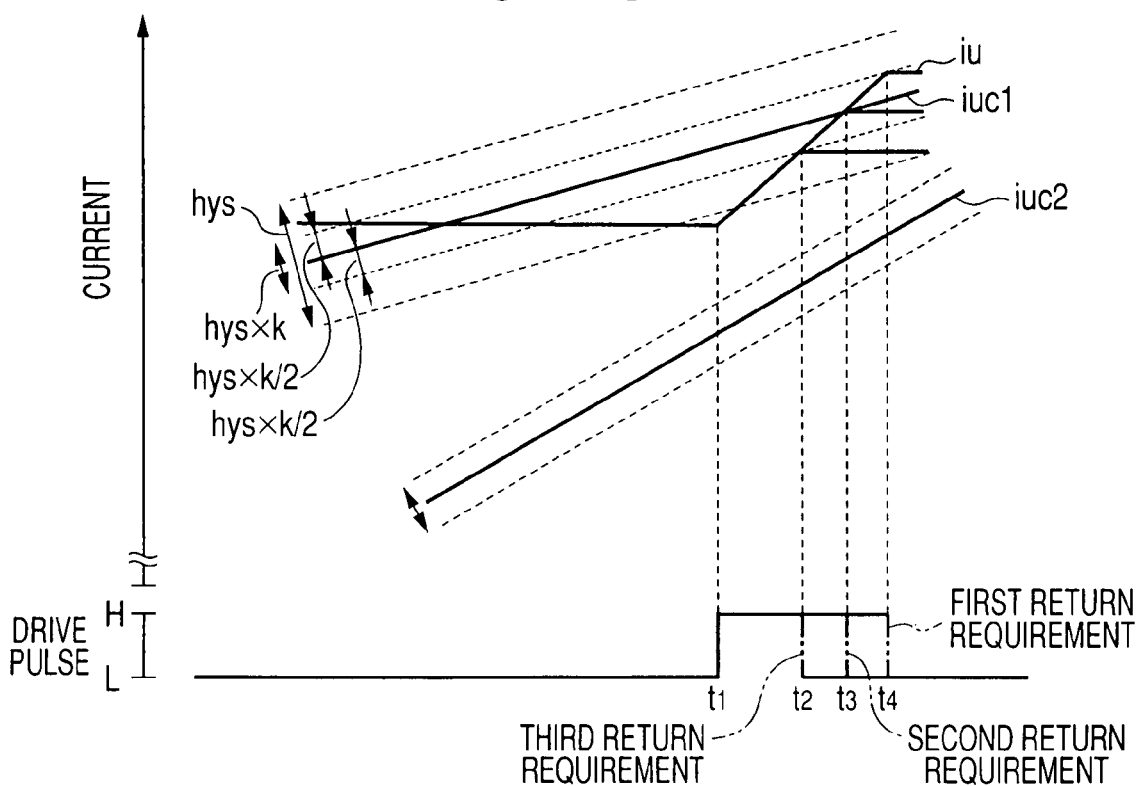
FIG. 25 is a waveform chart schematically illustrating waveforms of an actual U-phase instantaneous current, a first command value, a second command value, and a drive pulse according to the ninth embodiment.

FIG. 25 schematically illustrates the returning timings obtained by the sixth to eighth embodiments. Note that, in FIG. 25, the retuning timings for control of the U-phase are only illustrated, but the returning timings for control of the V- and W-phases can be the same as the U-phase.

In FIG. 25, the returning requirement described in the sixth embodiment, that is, the requirement of whether the instantaneous current iu is passed through the narrow hysteresis width "hys×k" is illustrated as a first returning requirement.

The returning requirement described in the seventh embodiment, that is, the requirement of whether the instantaneous current iu intersects with the first command value iuc1 is illustrated as a second returning requirement.

The returning requirement described in the eighth embodiment, that is, the requirement of whether the instantaneous current iu goes into the narrow hysteresis region established by the first command value iuc1 is illustrated as a third returning requirement.

As illustrated in FIG. 25, a drive pulse for driving switching elements for the U-phase is turned on when the instantaneous current iu goes out of the hysteresis region so that control for the instantaneous current iu is switched from the second instantaneous current control to the first instantaneous current control at t1.

Thereafter, under the control returning task executed by the determining logic 110 illustrated in FIG. 24, when the instantaneous current iu goes into the narrow hysteresis region at t2, the third requirement is satisfied. This allows the first instantaneous current control to be switched to the second instantaneous current control, resulting that the drive pulse is turned off at t2.

Under the control returning task executed by the determining logic 110 illustrated in FIG. 23, after the timing t1, when the instantaneous current iu intersects with the first command value iuc1 at t3, the second requirement is satisfied. This allows the first instantaneous current control to be switched to the second instantaneous current control, resulting that the drive pulse is turned off at t3.

Under the control returning task executed by the determining logic 110 illustrated in FIG. 22, after the timing t1, when the instantaneous current iu is passed through the narrow hysteresis region at t4, the first requirement is satisfied. This allows the first instantaneous current control to be switched to the second instantaneous current control, resulting that the drive pulse is turned off at t4.

Specifically, the returning timings of the first to third requirements are faster in the order of the third requirement, the second requirement, and the first requirement.

The higher the RPM of the motor 2 is, the more back electromotive force generated in the motor 2 is increased, which causes the change in the velocity of the instantaneous current iu to decrease; this instantaneous current iu flows through the U-phase winding of the motor 2. This may cause the response of the instantaneous current iu with respect to change in the first command value iuc1 to deteriorate after control for the instantaneous current iu is returned to the second instantaneous current control.

In addition, the more the request torque is increased in magnitude, the higher the amplitude of the first command value iuc1 is. This may require a major change in the instantaneous current iu, which desires more faster response of the instantaneous current iu at the same RPM in order to make the instantaneous current iu the first command value iuc1.

In view of the foregoing circumstances, in the ninth embodiment, during the high RPM and torque mode of the motor 2, after control for the instantaneous current iu is switched from the second instantaneous current control to the first instantaneous current control, a determining logic 110A of the microcomputer 50E is configured to shift a returning requirement form the first requirement to the third requirement depending on the increase in the RPM and the request torque.

Figure 26:
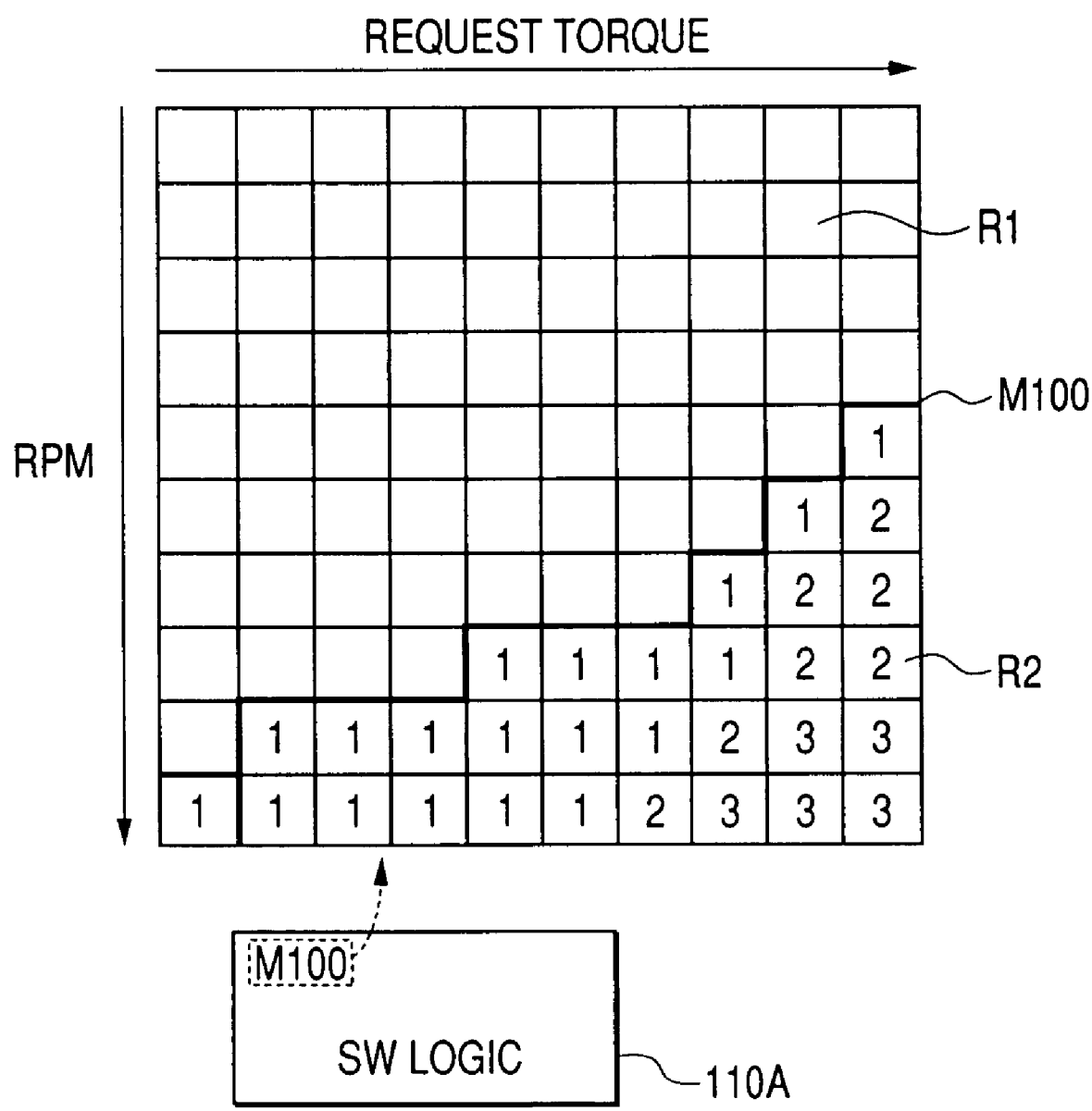
FIG. 26 is a view schematically illustrating a map according to the ninth embodiment.
Figure 27:
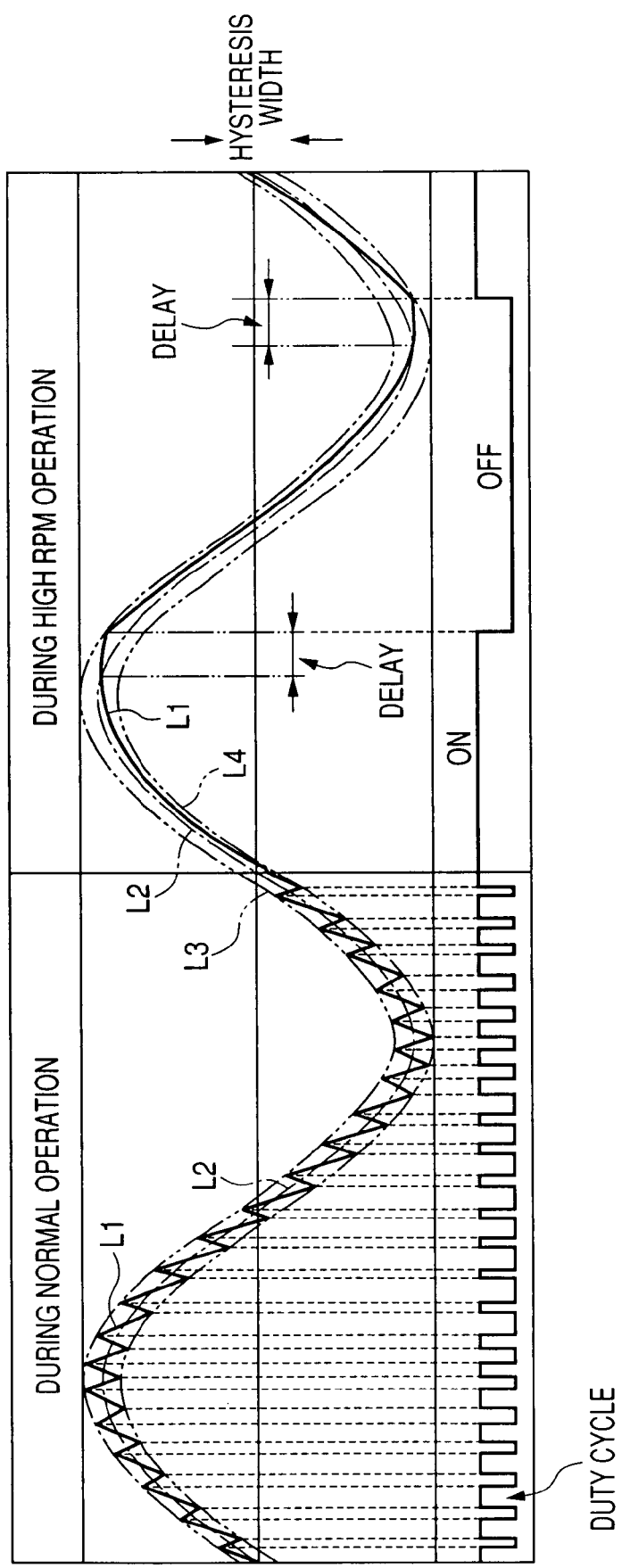
FIG. 27 is a view illustrating examples of waveforms schematically illustrating a current wave flowing through one phase of a three-phase rotary electric machine and a duty cycle (switching pattern) of the corresponding one phase.

Specifically, the determining logic 110A has a map M100 illustrated in FIG. 26. As illustrated in FIG. 26, the map M100 has a first region R1 and a second region R2 corresponding to the high RPM and torque mode of the motor 2.

In a first part of the second region R2, "1" is set, which allows the determining logic 110A to use the first requirement. In a second part of the second region R2 higher in RPM and greater in request torque than the first part, "2" is set, which allows the determining logic 100A to use the second requirement.

In a third part of the second region R2 higher in RPM and greater in request torque than the second part, "3" is set, which allows the determining logic 100A to use the third requirement.

Specifically, the determining logic 110A makes each of the instantaneous currents iu, iv, and iw properly follow a corresponding one of the first to third command values iuc1 to iwc1.

As described above, the control system 3 for the motor 2 according to the ninth embodiment can mainly achieve the following nineteenth effect in addition to the first to fifth effects, the ninth effect, and the fourteenth to eighteenth effects.

Specifically, the determining logic 110A shifts a returning requirement from the first returning requirement to the third returning requirement depending on the increase of the RPM of the motor 2 and the request torque. Therefore, it is possible to rapidly return control for each of the instantaneous currents iu, iv, and iw from the first instantaneous current control to the second instantaneous current control when the back electromotive force generated in the motor 2 is increased, so that the change in the velocity of the instantaneous current iu decreases. This can prevent each of the instantaneous currents iu to iw from being deviated from a corresponding one of the first to third command values iuc1 to iwc1.

The first to ninth embodiments and their modifications can be modified.

In the first embodiment, the third embodiment, or the sixth to ninth embodiments, a boundary at which the first command values iuc1, ivc1, and iwc1 are switched to the second command values iuc2, ivc2, and iwc2 can be different from that at which the second command values iuc2, ivc2, and iwc2 are switched to the first command values iuc1, ivc1, and iwc1.

Specifically, in a case where the different boundary concept is applied to the first embodiment, when the RPM of the motor 2 is a predetermined value N1 and the request torque is a predetermined value T1, the first command values iuc1, ivc1, and iwc1 are switched to the second command values iuc2, ivc2, and iwc2. In addition, when the RPM of the motor 2 is a predetermined value N2 and the request torque is a predetermined value T2, which are different from the predetermined value N1 and the predetermined value T1, the second command values iuc2, ivc2, and iwc2 are switched to the first command values iuc1, ivc1, and iwc1.

In a case where the different boundary concept is applied to the third embodiment, it is possible to use the maps described in the second embodiment.

The feedback control in the fourth and fifth embodiments is not limited to the PI control. Specifically, PID control can be used, and the integral control can be used in order to compensate for the deviation between the estimate value and the request torque under normal operation of the motor 2.

The three-phase command values are calculated after the d- and q-axis command values are calculated, but the three-phase command values can be directly calculated.

In the first to ninth embodiments and their modifications, the present invention is applied to the motor 2, but the present invention can be applied to various types of multiphase rotary electric machines, such as a generator. In this application, when the output torque having a large magnitude can be read with a negative torque having a large magnitude corresponding to a load torque having a large magnitude).

In first to ninth embodiments and their modifications, as a switching control method for each of the switching elements of the inverter 10, instantaneous control can be applied, but other types of switching control methods can be applied. For example, a PWM control method using a triangular carrier wave can be used during the low RPM/torque mode of the motor 2.

The control systems described in the first to ninth embodiments and their modifications can be applied to other types of vehicle, such as electric-powered vehicle.

In the first to ninth embodiments and their modifications, in step S10, when it is determined that both the request torque is greater in magnitude than the predetermined torque α and the RPM of the motor 2 is higher than the predetermined RPM β, the current vector value selector 66 determines that the motor 2 operates in the high RPM and torque mode. The present invention is however not limited to the structure.

Specifically, when it is determined that either the request torque is greater in magnitude than the predetermined torque α or the RPM of the motor 2 is higher than the predetermined RPM β, the current vector value selector 66 can determine that the motor 2 operates in the high RPM and torque mode.

In the first to ninth embodiments and their modifications, the functional modules are installed in the corresponding microcomputers, but can be installed in hardware devices, such as PGAs or dedicated LSI (Large-Scale Integration) circuits.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A control system for controlling, based on a comparison between a waved real current to be supplied to a multiphase rotary electric machine and a hysteresis region established by a waved command signal, a switching timing of a switching element of an inverter to which a direct current voltage is applied to thereby match the waved real current with a waved request current, the waved real current allowing a portion of the multiphase rotary electric machine to rotate, the waved command signal being set to the waved request current, the waved request current being required for the multiphase rotary electric machine to generate a request torque, the control system comprising:
   a determining unit configured to determine whether a workload associated with rotation of the portion of the multiphase rotary electric machine is equal to or greater than a corresponding predetermined value; and
   a changing unit configured to, when it is determined that the workload is equal to or greater than the predetermined value, change the waved command signal from being set to the waved request current so as to determine the switching timing of the switching element based on a positional relation between the waved request current and the changed waved command signal.

2. A control system according to claim 1, wherein the changing unit is configured to switch the waved command signal from being set to the waved request current to another waved command signal when it is determined that the workload is equal to or greater than the predetermined value, another waved command signal being equivalent in cycle to the request current wave, and greater in amplitude than the waved request current.

3. A control system according to claim 1, wherein the workload includes at least one of the number of revolutions of the multiphase rotary electric machine and an output torque thereof.

4. A control system according to claim 2, wherein the changing unit comprises:
   a first generator configured to generate a first waved command signal as the waved request current, the first waved command signal having a first cycle and a first amplitude;
   a second generator configured to generate a second waved command signal, the second waved command signal having a second cycle and a second amplitude, the second cycle being equivalent to the first cycle, the second amplitude being greater than the first amplitude; and a control unit configured to control, based on the comparison between the waved real current to be supplied to the multiphase rotary electric machine and a hysteresis region established by the second waved command signal, the switching timing of the switching element of the inverter.

5. A control system according to claim 4, wherein the second amplitude of the second waved command signal is set to be lower than a level, the level being calculated by multiplying a maximum rating current of the inverter by the square root of 2.

6. A control system according to claim 4, wherein the control unit is configured to apply a drive pulse to the switching element, the drive pulse having one logical high state and one logical low state during one cycle of the waved request current, the switching timing of the switching element corresponding to a reverse timing between the logical high state and the logical low state, wherein the switching timing of the switching element is substantially matched with an intersection between the second waved command signal and the waved request current.

7. A control system according to claim 4, wherein the second generator is configured to generate the second waved command signal based on the first waved command signal.

8. A control system according to claim 7, wherein the first waved command signal has a first phase, the second waved command signal has a second phase, the changing unit is configured to apply a drive pulse with a third phase to the switching element, the drive pulse having one logical high state and one logical low state during one cycle of the waved request current, and the second waved command signal is calculated based on the following equation:

$$T2 = T3 - \arcsin\{(A1/A2) \times \sin(T3 - T1)\}$$

where T1 represents the first phase of the first waved command signal, T2 represents the second phase of the second waved command signal, T3 represents the third phase of the drive pulse, A1 represents the first amplitude of the first waved command signal, and A2 represents the second amplitude of the second waved command signal.

9. A control system according to claim 4, wherein the workload includes at least one of the number of revolutions of the multiphase rotary electric machine and an output torque thereof, and the second generator is configured to:
store therein a map representing a relationship between the second waved command signal, the number of revolutions of the multiphase rotary electric machine, and the output torque thereof; and
calculate the second waved command signal based on the map, an input of the number of revolutions of the multiphase rotary electric machine, and an input of the output torque thereof.

10. A control system according to claim 9, wherein the multiphase rotary electric machine is a three-phase rotary electric machine having a direct axis (d-axis) and a quadrature axis (q-axis) whose phase is π/2 radian electric angle leading with respect to the direct axis during rotation of the portion of the rotary electric machine, and the second generator comprises:
a first module configured to calculate d-axis and q-axis command values in the d-axis and q-axis based on the map, an input of the number of revolutions of the multiphase rotary electric machine, and an input of the output torque thereof, the d-axis and q-axis command values constituting the second waved command signal; and
a converter configured to convert the d-axis and q-axis command values of the second waved command signal into three-phase command values.

11. A control system according to claim 10, wherein the first generator comprises:
a storing module configured to store therein a relationship map representing a relationship between the first waved command signal, the number of revolutions of the multiphase rotary electric machine, and the output torque thereof;
a second module configured to calculate d-axis and q-axis command values in the d-axis and q-axis based on the relationship map, an input of the number of revolutions of the multiphase rotary electric machine, and an input of the output torque thereof, the d-axis and q-axis command values constituting the first waved command signal, the converter converting the d-axis and q-axis command values of the first waved command signal into three-phase command values.

12. A control system according to claim 7, wherein the workload includes at least one of the number of revolutions of the multiphase rotary electric machine and an output torque thereof, the first generator comprises:
a storing module configured to store therein a relationship map representing a relationship between the first waved command signal, the number of revolutions of the multiphase rotary electric machine, and the output torque thereof;
a first calculation module configured to calculate d-axis and q-axis command values in the d-axis and q-axis based on the relationship map, an input of the number of revolutions of the multiphase rotary electric machine, and an input of the output torque thereof, the d-axis and q-axis command values constituting the first waved command signal; and
a first converting module configured to convert the d-axis and q-axis command values of the first waved command signal into three-phase command values based on electrical angular information associated with a rotational angle of the portion of the three-phase rotary electric machine, the second generator comprises:
a second calculation module having a correction map representing a relationship between a correction value, the number of revolutions of the multiphase rotary electric machine, and the output torque thereof, the correction value representing a relationship between each of the d-axis and q-axis command values of the first waved command signal and a corresponding one of d-axis and q-axis command values constituting the second waved command signal, the second calculation module being configured to calculate the d-axis and q-axis command values of the second waved command signal based on the calculated d-axis and q-axis command values of the first waved command signal and the correction map;
an angular corrector configured to correct the electrical angular information; and
a second converting module configured to convert the d-axis and q-axis command values of the second waved command signal into three-phase command values based on the corrected electrical angular information.

13. A control system according to claim 12, wherein the first generator includes a converter working to implement the first and second converting modules, so that the converter being shared with the second generator.

14. A control system according to claim 4, wherein the workload includes at least one of the number of revolutions of the multiphase rotary electric machine and an output torque thereof, and the control unit is configured to:

store therein a map representing a relationship between the second waved command signal, the number of revolutions of the multiphase rotary electric machine, and the output torque thereof;

switch the waved command signal from the first waved command signal to the second waved command signal based on a first boundary determined in the map, an input of the number of revolutions of the multiphase rotary electric machine, and an input of the output torque thereof; and switch the waved command signal from the second waved command signal to the first waved command signal based on a second boundary determined in the map, an input of the number of revolutions of the multiphase rotary electric machine, and an input of the output torque thereof, the first boundary and the second boundary being different from each other in the map.

15. A control system according to claim 4, further comprising:

an estimating unit configured to estimate an actual output torque of the multiphase rotary electric machine based on the waved real current; and a correcting unit configured to carry out feedback correction of a phase of the second waved command signal based on a difference between the request torque and the estimated output torque.

16. A control system according to claim 15, wherein the correcting unit is configured to carry out, as at least part of the feedback correction, integral control of the phase of the second waved command signal based on an integral of the difference between the request torque and the estimated output torque.

17. A control system according to claim 16, wherein the workload includes at least one of the number of revolutions of the multiphase rotary electric machine and the output torque thereof, and the correcting unit is configured to:

measure an amount of change in at least one of the umber of revolutions of the multiphase rotary electric machine and the output torque thereof;

determine whether the measured amount of change is equal to or greater than a predetermined amount; and initialize the integral of the difference between the request torque and the estimated output torque when it is determined that the measured amount of change is equal to or greater than the predetermined amount.

18. A control system according to claim 4, further comprising:

an estimating unit configured to estimate an actual output torque of the multiphase rotary electric machine based on the waved real current; and a correcting unit configured to carry out feedback correction of a center of the hysteresis region based on a difference between the request torque and the estimated output torque, the center of the hysteresis region being established by the second waved command signal.

19. A control system according to claim 18, wherein the correcting unit is configured to carry out, as at least part of the feedback correction, integral control of the phase of the second waved command signal based on an integral of the difference between the request torque and the estimated output torque.

20. A control system according to claim 19, wherein the workload includes at least one of the number of revolutions of the multiphase rotary electric machine and the output torque thereof, and the correcting unit is configured to:

measure an amount of change in at least one of the umber of revolutions of the multiphase rotary electric machine and the output torque thereof;

determine whether the measured amount of change is equal to or greater than a predetermined amount; and initialize the integral of the difference between the request torque and the estimated output torque when it is determined that the measured amount of change is equal to or greater than the predetermined amount.

21. A control system according to claim 4, wherein the multiphase rotary electric machine has a plurality of phase windings, the inverter includes a plurality of switches corresponding to the switching element, and the real waved current is supplied to each of the plurality of phase windings via a corresponding at least one of the switches, and the control unit is configured to:

when the real waved current for at least one of the phase windings goes out of the hysteresis region established by the first waved command signal, forcibly change control of the switching timing of at least one of the switches corresponding to the at least one of the phase windings to the control based on the hysteresis region established by the first waved command signal.

22. A control system according to claim 21, wherein the control unit is configured to:

determine whether the real waved current for the at least one of the phase windings follows the first waved command signal; and return control of the switching timing of the at least one of the switches corresponding to the at least one of the phase windings to the control based on the hysteresis region established by the second waved command signal when it is determined that the real waved current for the at least one of the phase windings follows the first waved command signal.

23. A control system according to claim 22, wherein the control unit is configured to:

establish a narrow hysteresis region contained in the hysteresis region established by the first waved command signal; and return control of the switching timing of the at least one of the switches corresponding to the at least one of the phase windings to the control based on the hysteresis region established by the second waved command signal when it is determined that the real waved current for the at least one of the phase windings is passed through the narrow hysteresis region.

24. A control system according to claim 22, wherein the control unit is configured to return control of the switching timing of the at least one of the switches corresponding to the at least one of the phase windings to the control based on the hysteresis region established by the second waved command signal when it is determined that the real waved current for the at least one of the phase windings intersects with the first waved command signal.

25. A control system according to claim 22, wherein the control unit is configured to:

establish a narrow hysteresis region contained in the hysteresis region established by the first waved command signal; and return control of the switching timing of the at least one of the switches corresponding to the at least one of the phase windings to the control based on the hysteresis region established by the second waved command signal when it is determined that the real waved current for the at least one of the phase windings is lied within the narrow hysteresis region.

26. A control system according to claim 22, wherein the workload includes the number of revolutions of the multiphase rotary electric machine and the output torque thereof, the number of revolutions of the multiphase rotary electric machine and the output torque thereof defining a first range, a second range, and a third range, the first range and second range being lower in the number of revolutions than the third range, the first range being lower in the number of revolutions than the second range, and the control unit comprises:

an establish module configured to establish a narrow hysteresis region contained in the hysteresis region established by the first waved command signal; and an executing unit configured to selectively execute:

a first task when an input number of revolutions of the multiphase rotary electric machine belongs to the first range;

a second task when an input number of revolutions of the multiphase rotary electric machine belongs to the second range; and a third task when an input number of revolutions of the multiphase rotary electric machine belongs to the third range, the first task returning control of the switching timing of the at least one of the switches corresponding to the at least one of the phase windings to the control based on the hysteresis region established by the second waved command signal when it is determined that the real waved current for the at least one of the phase windings is passed through the narrow hysteresis region, the second task returning control of the switching timing of the at least one of the switches corresponding to the at least one of the phase windings to the control based on the hysteresis region established by the second waved command signal when it is determined that the real waved current for the at least one of the phase windings intersects with the first waved command signal, the third task returning control of the switching timing of the at least one of the switches corresponding to the at least one of the phase windings to the control based on the hysteresis region established by the second waved command signal when it is determined that the real waved current for the at least one of the phase windings is lied within the narrow hysteresis region.

* * * * *